(12) United States Patent
Miyagishima et al.

(10) Patent No.: US 10,268,030 B2
(45) Date of Patent: Apr. 23, 2019

(54) ZOOM LENS AND IMAGING APPARATUS

(71) Applicant: FUJIFILM Corporation, Tokyo (JP)

(72) Inventors: Shunsuke Miyagishima, Saitama (JP); Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/910,043

(22) Filed: Mar. 2, 2018

(65) Prior Publication Data

US 2018/0259754 A1 Sep. 13, 2018

(30) Foreign Application Priority Data

Mar. 8, 2017 (JP) ................. 2017-043539

(51) Int. Cl.
*G02B 15/14* (2006.01)
*G02B 15/20* (2006.01)
*G02B 13/00* (2006.01)
*G02B 13/02* (2006.01)
*G02B 15/17* (2006.01)
*G02B 27/64* (2006.01)

(52) U.S. Cl.
CPC ........... *G02B 15/20* (2013.01); *G02B 13/009* (2013.01); *G02B 13/0045* (2013.01); *G02B 13/02* (2013.01); *G02B 15/17* (2013.01); *G02B 27/646* (2013.01)

(58) Field of Classification Search
CPC .................................................. G02B 13/0045
USPC ...................................................... 359/684
See application file for complete search history.

(56) References Cited

U.S. PATENT DOCUMENTS

2015/0130985 A1* 5/2015 Kawamura .......... H04N 5/2254
348/345

FOREIGN PATENT DOCUMENTS

| JP | 2014-044249 A | 3/2014 |
| JP | 2015-026027 A | 2/2015 |
| JP | 2015-210370 A | 11/2015 |
| JP | 2015-210371 A | 11/2015 |

* cited by examiner

*Primary Examiner* — James C. Jones
(74) *Attorney, Agent, or Firm* — Studebaker & Brackett PC

(57) ABSTRACT

The zoom lens consisting of, in order from an object side: a first lens group that has a positive refractive power; a second lens group that has a negative refractive power; a third lens group that has a negative refractive power; an intermediate part; and a final lens group that has a positive refractive power. The first lens group consists of three lenses, and has a cemented lens which is formed by cementing at least one positive lens and at least one negative lens. The second lens group consists of, in order from the object side, a negative meniscus lens, a biconcave lens, and a biconvex lens. The third lens group consists of one lens. The final lens group has a lens, which is convex toward an image side, at a position closest to the image side. Each lens group moves in a predetermined direction during zooming, and only the third lens group moves in the direction of the optical axis during focusing, and predetermined conditional expressions are satisfied.

20 Claims, 26 Drawing Sheets

EXAMPLE 3

EXAMPLE 5

EXAMPLE 2

WIDE

EXAMPLE 3

EXAMPLE 4

ZOOM LENS AND IMAGING APPARATUS

CROSS REFERENCE TO RELATED APPLICATIONS

The present application claims priority under 35 U.S.C. § 119 to Japanese Patent Application No. 2017-043539 filed on Mar. 8, 2017. The above application is hereby expressly incorporated by reference, in its entirety, into the present application.

BACKGROUND OF THE INVENTION

1. Field of the Invention

The present invention relates to a zoom lens, which is particularly suitable for a digital camera, a lens interchangeable type digital camera, a movie imaging camera, and the like, and an imaging apparatus comprising the zoom lens.

2. Description of the Related Art

As zoom lenses used for digital cameras, lens interchangeable digital cameras, movie imaging cameras, and the like, zoom lenses described in JP2015-210370A, JP2015-210371A, JP2015-26027A, and JP2014-44249A are known.

SUMMARY OF THE INVENTION

In the zoom lens described above, a zoom lens having a high magnification and a short total length is desired. In the zoom lens in the related art, the total length of the lens tends to increase as the magnification increases. In all of the zoom lenses of JP2015-210370A, JP2015-210371A, JP2015-26027A, and JP2014-44249A, both the increase in magnification and reduction in total length are not achieved.

The present invention has been made in consideration of the above-mentioned situation, and its object is to provide a zoom lens having a high magnification and a short total length, and an imaging apparatus comprising the zoom lens.

A zoom lens of the present invention consists of, in order from an object side: a first lens group that has a positive refractive power; a second lens group that has a negative refractive power; a third lens group that has a negative refractive power; an intermediate part that consists of one lens group or a plurality of lens groups; and a final lens group that has a positive refractive power. The first lens group consists of three lenses, and has a cemented lens which is formed by cementing at least one positive lens and at least one negative lens. The second lens group consists of, in order from the object side, a negative meniscus lens, a biconcave lens, and a biconvex lens. The third lens group consists of one lens. The final lens group has a lens, which is convex toward an image side, at a position closest to the image side. During zooming from a wide-angle end to a telephoto end, a distance between the first lens group and the second lens group constantly increases, a distance between the second lens group and the third lens group changes, a distance between the third lens group and the intermediate part constantly decreases, and a distance between the intermediate part and the final lens group constantly increases. During focusing, only the third lens group moves in a direction of an optical axis. In addition, assuming that a focal length of the first lens group is f1 and a focal length of the second lens group is f2, Conditional Expression (1) is satisfied.

$$3.5 < f1/(-f2) < 5.5 \quad (1)$$

It is more preferable that the following conditional expression (1-1) is satisfied.

$$4 < f1/(-f2) < 5 \quad (1-1)$$

In the zoom lens of the present invention, assuming that a focal length of the third lens group is f3 and a focal length of the second lens group is f2, it is preferable that Conditional Expression (2) is satisfied, and it is more preferable that Conditional Expression (2-1) is satisfied.

$$1 < f3/f2 < 3 \quad (2)$$

$$1.5 < f3/f2 < 2.5 \quad (2-1)$$

Assuming that a total lens length at the wide-angle end is TTLw and a back focal length at the wide-angle end is Bfw, it is preferable that Conditional Expression (3) is satisfied, and it is more preferable that Conditional Expression (3-1) is satisfied.

$$4 < TTLw/Bfw < 7 \quad (3)$$

$$5 < TTLw/Bfw < 6.5 \quad (3-1)$$

Assuming that a focal length of the whole system during focusing on an object at infinity at the wide-angle end is fw and a focal length of the first lens group is f1, it is preferable that Conditional Expression (4) is satisfied, and it is more preferable that Conditional Expression (4-1) is satisfied.

$$0.18 < fw/f1 < 0.3 \quad (4)$$

$$0.18 < fw/f1 < 0.28 \quad (4-1)$$

Assuming that a focal length of the whole system during focusing on an object at infinity at the wide-angle end is fw and a focal length of the second lens group is f2, it is preferable that Conditional Expression (5) is satisfied, and it is more preferable that Conditional Expression (5-1) is satisfied.

$$0.5 < fw/(-f2) < 1 \quad (5)$$

$$0.6 < fw/(-f2) < 0.9 \quad (5-1)$$

Assuming that a distance on an optical axis between the second lens group and the third lens group at the wide-angle end is L23 and a focal length of the whole system during focusing on an object at infinity at the wide-angle end is fw, it is preferable that Conditional Expression (6) is satisfied, and it is more preferable that Conditional Expression (6-1) is satisfied.

$$0.4 < L23/fw < 1 \quad (6)$$

$$0.5 < L23/fw < 0.8 \quad (6-1)$$

It is preferable that the intermediate part has a positive refractive power as a whole, and consists of, in order from the object side, a first positive intermediate part lens group that has a positive refractive power, a second negative intermediate part lens group that has a negative refractive power, and a third positive intermediate part lens group that has a positive refractive power. In addition, it is preferable that during a vibration-proof operation, only the second negative intermediate part lens group moves in a direction perpendicular to the optical axis.

It is preferable that the intermediate part has a positive refractive power as a whole, and consists of, in order from the object side, a biconvex lens, a cemented lens that consists of a biconvex lens and a negative meniscus lens, a cemented lens that consists of a positive meniscus lens and a biconcave lens, a positive lens, and a negative meniscus lens. In addition, it is preferable that during a vibration-proof operation, only some lenses of the intermediate part move in a direction perpendicular to the optical axis.

In this case, it is preferable that the cemented lens, which consists of the positive meniscus lens and the biconcave lens, has a negative refractive power as a whole. In addition, it is preferable that during a vibration-proof operation, only the cemented lens, which consists of the positive meniscus lens and the biconcave lens, moves in the direction perpendicular to the optical axis.

The intermediate part may consist of only the fourth lens group which is one lens group. The intermediate part may consist of, in order from the object side, a fourth lens group and a fifth lens group by which a distance between the fifth lens group and the fourth lens group changes during zooming.

It is preferable that the first lens group has a negative meniscus lens, which is concave toward the image side, at a position closest to the object side.

It is preferable that the final lens group consists of one lens.

It is preferable that the third lens group consists of a double-sided aspheric lens.

An imaging apparatus of the present invention comprises the above-mentioned zoom lens of the present invention.

It should be noted that the term "consists of ~" means that the imaging lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Further, surface shapes and reference signs of refractive powers of the lenses are assumed as those in paraxial regions in a case where some lenses have aspheric surfaces.

Advantages of Invention

According to the present invention, the zoom lens consists of, in order from the object side: the first lens group that has a positive refractive power; the second lens group that has a negative refractive power; the third lens group that has a negative refractive power; the intermediate part that consists of one lens group or a plurality of lens groups; and the final lens group that has a positive refractive power. The first lens group consists of three lenses, and has a cemented lens which is formed by cementing at least one positive lens and at least one negative lens. The second lens group consists of, in order from the object side, the negative meniscus lens, the biconcave lens, and the biconvex lens. The third lens group consists of one lens. The final lens group has the lens, which is convex toward the image side, at the position closest to the image side. During zooming from the wide-angle end to the telephoto end, the distance between the first lens group and the second lens group constantly increases, the distance between the second lens group and the third lens group changes, the distance between the third lens group and the intermediate part, and the distance between the intermediate part and the final lens group constantly increases. During focusing, only the third lens group moves in the direction of the optical axis. In addition, assuming that the focal length of the first lens group is f1 and the focal length of the second lens group is f2, Conditional Expression (1) is satisfied. Therefore, it is possible to provide a zoom lens having a high magnification and a short total length, and an imaging apparatus comprising the zoom lens.

$$3.5 < f1/(-f2) < 5.5 \quad (1)$$

DESCRIPTION OF THE PREFERRED EMBODIMENTS

Figure 1:
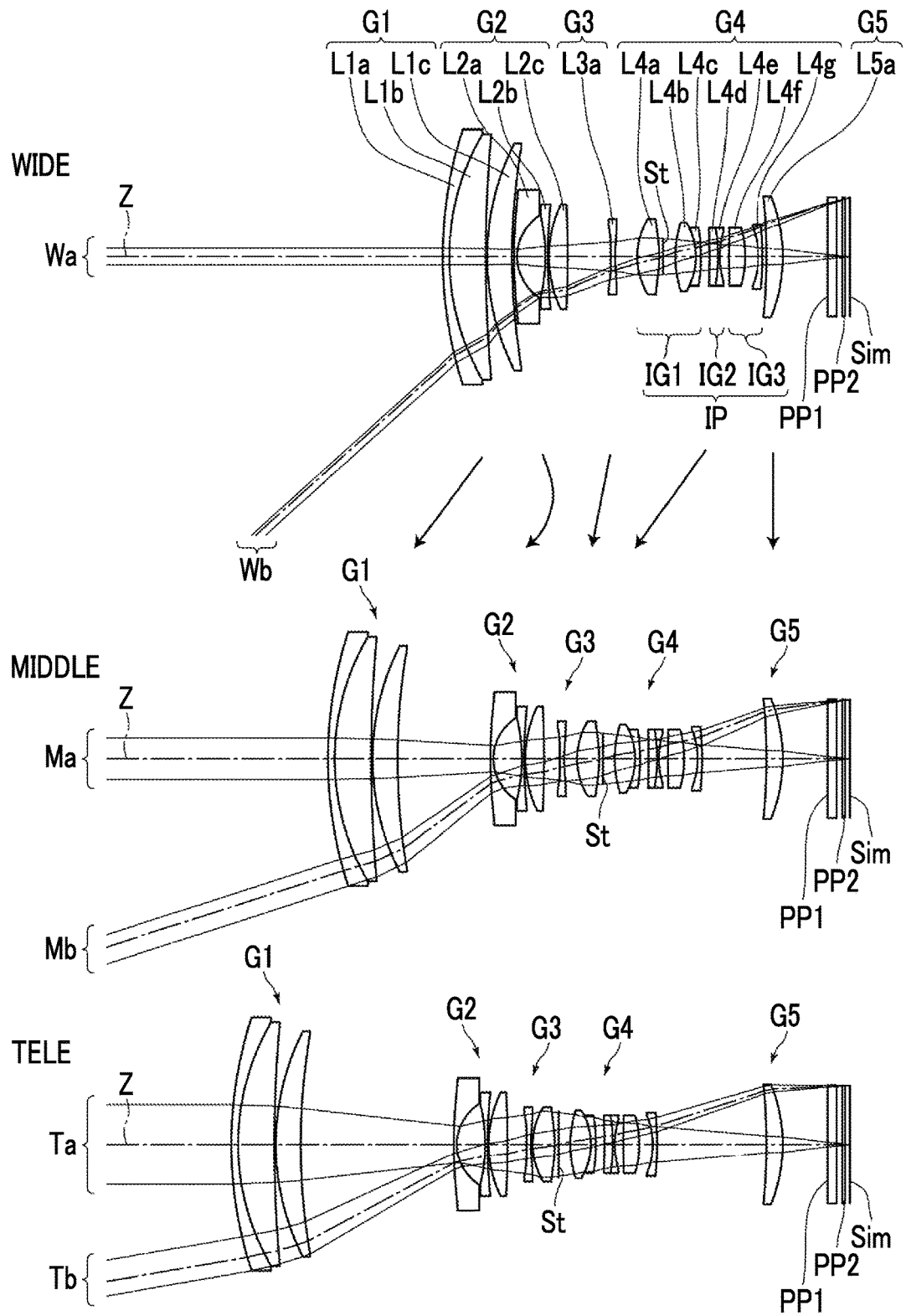
FIG. 1 is a cross-sectional view illustrating a lens configuration of a zoom lens (common to Example 1) according to an embodiment of the present invention.

Hereinafter, embodiments of the present invention will be described with reference to drawings. FIG. 1 is a cross-sectional view illustrating a lens configuration of a zoom lens according to an embodiment of the present invention. The exemplary configuration shown in FIG. 1 is the same as the configuration of the zoom lens of Example 1. In FIG. 1, the left side is an object side, and the right side is an image side. In addition, an aperture stop St shown in the drawing does not necessarily show its real size and shape, but show a position on an optical axis Z.

In FIG. 1, aberrations in the wide-angle end state are shown in the upper part indicated by "WIDE", on-axis rays Wa and rays with the maximum angle of view Wb are shown as rays. Further, aberrations in the middle position state are shown in the middle part indicated by "MIDDLE", on-axis rays Ma and rays with the maximum angle of view Mb are shown as rays. In addition, aberrations in the telephoto end state are shown in the lower part indicated by "TELE", and on-axis rays Ta and rays with the maximum angle of view Tb are shown as rays. All of these show a state in which the object at infinity is in focus.

As shown in FIG. 1, the zoom lens of the present embodiment consists of, in order from the object side, a first lens group G1 that has a positive refractive power; a second lens group G2 that has a negative refractive power; a third lens group G3 that has a negative refractive power; an intermediate part IP that consists of one lens group or a plurality of lens groups; and a final lens group (a fifth lens group G5 in this embodiment) that has a positive refractive power.

In order to apply this zoom lens to an imaging apparatus, according to a configuration of the camera on which the lens is mounted, it is preferable that a cover glass, a prism, and various filters such as an infrared cutoff filter and a lowpass filter are disposed between the optical system and an image plane Sim. Therefore, FIG. 1 shows an example where the plane-parallel-plate-like optical members PP1 and PP2, in which those are considered, are disposed between the lens system and the image plane Sim.

The first lens group G1 consists of three lenses, and has a cemented lens which is formed by cementing at least one positive lens and at least one negative lens. As described above, the positive refractive power is increased using all the positive lenses of the first lens group G1, and a cemented lens is formed by combining at least some of the positive lenses with a negative lens. Thereby, it is possible to suitably correct longitudinal chromatic aberration. In a case where the number of positive lenses is set to four or more, this setting is not preferable in that the thickness in the direction of the optical axis and the effective diameter are increased.

The second lens group G2 consists of, in order from the object side, a negative meniscus lens, a biconcave lens, and a biconvex lens. The second lens group G2 has a major function of zooming. By setting the number of negative lenses in the second lens group G2 to two, there is an effect of suppressing occurrence of various aberrations, particularly, spherical aberration and distortion, generated by the negative lenses. In addition, a positive lens is disposed to be closest to the image side. Thereby, there is an effect of correcting overcorrected spherical aberration and longitudinal chromatic aberration, which are particularly likely to occur on the telephoto side.

In the configuration, the third lens group G3 consists of one lens, and only the third lens group G3 moves in a direction of an optical axis during focusing. As described above, the third lens group G3 is composed of one lens. Thereby, the third lens group G3, which is a focusing group, can be configured to be lightweight. As a result, this leads to an increase in speed of focusing. Further, although the effect of the increase in speed can be expected regardless of the autofocus method, in a case where wobbling is performed in a contrast autofocus mode, it is necessary to further reduce the weight of the focusing group. As a result, a high effect can be expected. Furthermore, by performing focusing through the third lens group G3 which is at a position where the on-axis marginal ray incident on the lens is gently inclined, there is an effect of suppressing fluctuation in spherical aberration due to the in-focus position.

The final lens group (the fifth lens group G5 in the present embodiment) has a positive refractive power as described above, and has a lens, which is convex toward an image side, at a position closest to the image side. As described above, by proving a positive refractive power to the final lens group, there is an advantage in minimizing an incident angle of rays on the image plane Sim at the wide-angle end, and suppressing distortion and lateral chromatic aberration at the telephoto end. In addition, the lens convex toward the image side is disposed to be closest to the image side, whereby there is an advantage in suppressing astigmatism.

In the configuration, during zooming from the wide-angle end to the telephoto end, a distance between the first lens group G1 and the second lens group G2 constantly increases, a distance between the second lens group G2 and the third lens group G3 changes, a distance between the third lens group G3 and the intermediate part IP constantly decreases, and a distance between the intermediate part IP and the final lens group constantly increases. With such a configuration, there is an advantage for high magnification.

In the configuration, assuming that a focal length of the first lens group G1 is f1 and a focal length of the second lens group G2 is f2, Conditional Expression (1) is satisfied. By not allowing the result of Conditional Expression (1) to be equal to or less than the lower limit, there is an effect of reducing the total length on the telephoto side. Further, by not allowing the power of the first lens group G1 to be equal to or less than the lower limit of Conditional Expression (1), it is possible to suppress occurrence of coma aberration. By not allowing the result of Conditional Expression (1) to be equal to or greater than the upper limit, there is an effect of achieving an increase in magnification. In addition, in a case where Conditional Expression (1-1) is satisfied, it is possible to obtain more favorable characteristics.

$$3.5 < f1/(-f2) < 5.5 \quad (1)$$

$$4 < f1/(-f2) < 5 \quad (1\text{-}1)$$

In the zoom lens of the present embodiment, assuming that a focal length of the third lens group G3 is f3 and a focal length of the second lens group G2 is f2, it is preferable that Conditional Expression (2) is satisfied. By not allowing the result of Conditional Expression (2) to be equal to or less than the lower limit, there is an effect of reducing the total length on the wide-angle side. By not allowing the result of Conditional Expression (2) to be equal to or greater than the upper limit, there is an effect of achieving an increase in magnification. In addition, in a case where Conditional Expression (2-1) is satisfied, it is possible to obtain more favorable characteristics.

$$1 < f3/f2 < 3 \qquad (2)$$

$$1.5 < f3/f2 < 2.5 \qquad (2\text{-}1)$$

Assuming that a total lens length at the wide-angle end is TTLw and a back focal length at the wide-angle end is Bfw, it is preferable that Conditional Expression (3) is satisfied. By not allowing the result of Conditional Expression (3) to be equal to or less than the lower limit, it is possible to minimize the incident angle of rays incident onto the image plane Sim. By not allowing the result of Conditional Expression (3) to be equal to or greater than the upper limit, there is an effect of reducing the total length on the wide-angle side. In addition, in a case where Conditional Expression (3-1) is satisfied, it is possible to obtain more favorable characteristics.

$$4 < TTLw/Bfw < 7 \qquad (3)$$

$$5 < TTLw/Bfw < 6.5 \qquad (3\text{-}1)$$

Assuming that a focal length of the whole system during focusing on an object at infinity at the wide-angle end is fw and a focal length of the first lens group G1 is f1, it is preferable that Conditional Expression (4) is satisfied. By not allowing the result of Conditional Expression (4) to be equal to or less than the lower limit, it is effective to suppress an increase in outer diameter of the lens. By not allowing the result of Conditional Expression (4) to be equal to or greater than the upper limit, there is an effect of reducing the total length on the wide-angle side. In addition, in a case where Conditional Expression (4-1) is satisfied, it is possible to obtain more favorable characteristics.

$$0.18 < fw/f1 < 0.3 \qquad (4)$$

$$0.18 < fw/f1 < 0.28 \qquad (4\text{-}1)$$

Assuming that a focal length of the whole system during focusing on an object at infinity at the wide-angle end is fw and a focal length of the second lens group G2 is f2, it is preferable that Conditional Expression (5) is satisfied. By not allowing the result of Conditional Expression (5) to be equal to or less than the lower limit, there is an effect of reducing the total length on the telephoto side. By not allowing the result of Conditional Expression (5) to be equal to or greater than the upper limit, there is an effect of reducing the total length on the wide-angle side. In addition, in a case where Conditional Expression (5-1) is satisfied, it is possible to obtain more favorable characteristics.

$$0.5 < fw/(-f2) < 1 \qquad (5)$$

$$0.6 < fw/(-f2) < 0.9 \qquad (5\text{-}1)$$

Assuming that a distance on an optical axis between the second lens group G2 and the third lens group G3 at the wide-angle end is L23 and a focal length of the whole system during focusing on an object at infinity at the wide-angle end is fw, it is preferable that Conditional Expression (6) is satisfied. By not allowing the result of Conditional Expression (6) to be equal to or less than the lower limit, there are effects of achieving a wide angle and for focusing. By not allowing the result of Conditional Expression (6) to be equal to or greater than the upper limit, there is an effect of achieving an increase in magnification while minimizing the total length. In addition, in a case where Conditional Expression (6-1) is satisfied, it is possible to obtain more favorable characteristics.

$$0.4 < L23/fw < 1 \qquad (6)$$

$$0.5 < L23/fw < 0.8 \qquad (6\text{-}1)$$

It is preferable that the intermediate part IP has a positive refractive power as a whole, and consists of, in order from the object side, a first positive intermediate part lens group IG1 that has a positive refractive power, a second negative intermediate part lens group IG2 that has a negative refractive power, and a third positive intermediate part lens group IG3 that has a positive refractive power. In addition, it is preferable that during a vibration-proof operation, only the second negative intermediate part lens group IG2 moves in a direction perpendicular to the optical axis Z. As described above, by adopting a configuration in which refractive powers in the intermediate part IP are set to be positive, negative, and positive refractive powers in order from the object side, it is possible to effectively improve a vibration-proof sensitivity while reducing the total length.

It is preferable that the intermediate part IP has a positive refractive power as a whole, and consists of, in order from the object side, a biconvex lens, a cemented lens that consists of a biconvex lens and a negative meniscus lens, a cemented lens that consists of a positive meniscus lens and a biconcave lens, a positive lens, and a negative meniscus lens. In addition, it is preferable that during a vibration-proof operation, only some lenses of the intermediate part IP moves in a direction perpendicular to the optical axis Z. With such a configuration, it becomes easy to suppress occurrence of astigmatism and distortion while reducing the total length.

In this case, it is preferable that the cemented lens, which consists of the positive meniscus lens and the biconcave lens, has a negative refractive power as a whole. In addition, it is preferable that during a vibration-proof operation, only the cemented lens, which consists of the positive meniscus lens and the biconcave lens, moves in the direction perpendicular to the optical axis Z. With such a configuration, it is possible to suppress chromatic aberration generated during the vibration-proof operation and suppress fluctuation in astigmatism.

In a similar manner to those of the configurations of Examples 1 to 4 shown in FIGS. 1 to 4, the zoom lens may be configured to consist of five lens groups as a whole. In this case, the intermediate part IP consists of only a fourth lens group G4 which is one lens group, and a fifth lens group G5 corresponds to the final lens group. With such a configuration, a zoom lens can be composed of a small number of lens groups. As a result, the configuration can be simplified.

Figure 5:
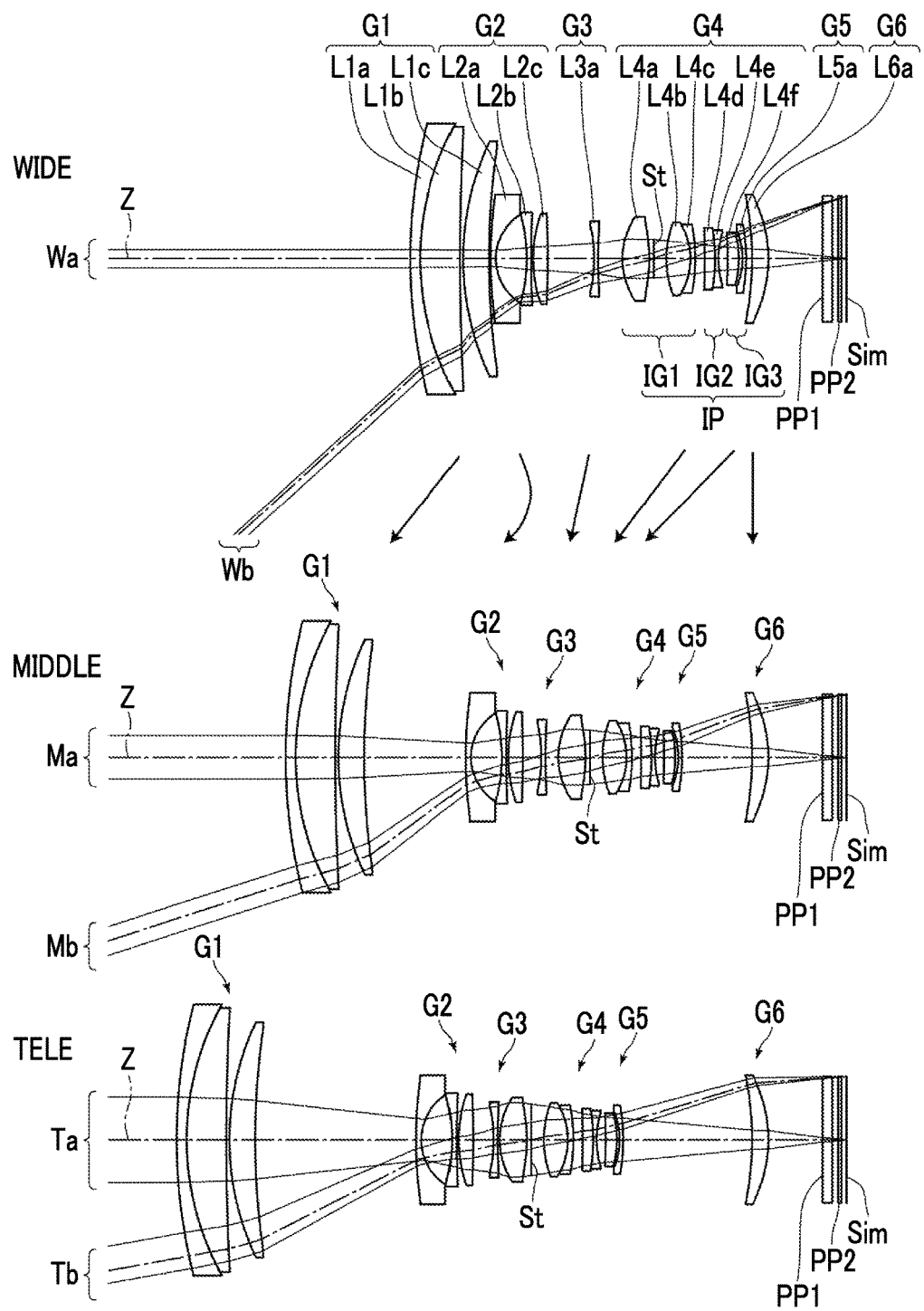
FIG. 5 is a cross-sectional view illustrating a lens configuration of a zoom lens of Example 5 of the present invention.

In a similar manner to that of the configuration of Example 5 shown in FIG. 5, the zoom lens may be configured to consist of six lens groups as a whole. In this case, the intermediate part IP consists of, in order from the object side, a fourth lens group G4 and a fifth lens group G5 by which a distance between the fifth lens group G5 and the fourth lens group G4 changes during zooming, and the sixth lens group G6 corresponds to the final lens group. With such a configuration, there is an advantage in correcting various aberrations.

It is preferable that the first lens group G1 has a negative meniscus lens, which is concave toward the image side, at a position closest to the object side. With such a configuration, it is possible to prevent lateral chromatic aberration of the peripheral portion from being overcorrected on the wide-angle side.

It is preferable that the final lens group consists of one lens. With such a configuration, there is an advantage in reducing the total length of the lens.

It is preferable that the third lens group G3 consists of a double-sided aspheric lens. With such a configuration, it is possible to suppress fluctuations in spherical aberration and astigmatism during focusing.

In a case of using the zoom lens under severe environment, it is preferable to perform protective multilayer film coating. Not only the protective coating but also antireflective coating for reducing ghost light in use may be performed.

In the example shown in FIG. 1, the optical members PP1 and PP2 are disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the zoom lens of the present invention will be described.

First, a zoom lens of Example 1 will be described. FIG. 1 is a cross-sectional view illustrating a lens configuration of the zoom lens of Example 1. In FIG. 1 and FIGS. 2 to 5 corresponding to Examples 2 to 5 to be described later, left sides thereof are the object side, and right sides thereof are the image side. In addition, the aperture stop St shown in the drawings does not necessarily indicate its size or shape, and indicates a position thereof on the optical axis Z.

In FIGS. 1 to 5, aberrations in the wide-angle end state are shown in the upper part indicated by "WIDE", on-axis rays Wa and rays with the maximum angle of view Wb are shown as rays. Further, aberrations in the middle position state are shown in the middle part indicated by "MIDDLE", and on-axis rays Ma and rays with the maximum angle of view Mb are shown as rays. In addition, aberrations in the telephoto end state are shown in the lower part indicated by "TELE", and on-axis rays Ta and rays with the maximum angle of view Tb are shown as rays. All of these show a state in which the object at infinity is in focus.

The zoom lens of Example 1 consists of five lens groups as a whole. The first lens group G1 is composed of three lenses L1a to L1c, the second lens group G2 is composed of three lenses L2a to L2c, the third lens group G3 is composed of only one lens L3a, the fourth lens group G4 is composed of seven lenses L4a to L4g, and the fifth lens group G5 is composed of only one lens L5a. The fourth lens group G4 corresponds to the intermediate part IP, and the fifth lens group G5 corresponds to the final lens group.

Table 1 shows lens data of the zoom lens of Example 1, Table 2 shows data about specification, Table 3 shows surface distances which are variable during zooming, and Table 4 shows data about aspheric coefficients thereof. Hereinafter, meanings of the reference signs in the tables are, for example, as described in Example 1, and are basically the same as those in Examples 2 to 5.

In the lens data of Table 1, the column of the surface number shows surface numbers. The surface of the elements closest to the object side is the first surface, and the surface numbers sequentially increase toward the image side. The column of the radius of curvature shows radii of curvature of the respective surfaces. The column of the on-axis surface distance shows spacings on the optical axis Z between the respective surfaces and the subsequent surfaces. Further, the column of n shows a refractive index of each optical element at the d line (a wavelength of 587.6 nm (nanometers)), and the column of νd shows an Abbe number of each optical element at the d line (a wavelength of 587.6 nm (nanometers)). Here, the sign of the radius of curvature is positive in a case where a surface has a shape convex toward the object side, and is negative in a case where a surface has a shape convex toward the image side. The lens data additionally shows the optical members PP1 and PP2. Further, in the lens data, in each place of the surface distance which is variable during focusing, DD[surface number] is noted. Numerical values each corresponding to the DD[surface number] are shown in Table 3.

The data about specification of Table 2 shows values of the zoom ratio at each of the wide-angle end (WIDE), the middle position (MIDDLE), and the telephoto end (TELE), the focal length f' of the whole system, the back focal length Bf', the F number FNo, and the total angle of view 2ω.

In the lens data of Table 1, the reference sign * is attached to surface numbers of aspheric surfaces, and radii of curvature of the aspheric surfaces are represented by numerical values of paraxial radii of curvature. The data about aspheric coefficients of Table 4 shows the surface numbers of the aspheric surfaces and aspheric coefficients of the aspheric surfaces. The "E±n" (n: an integer) in numerical values of the aspheric coefficients of Table 4 indicates "×10$^{\pm n}$". The aspheric coefficients are values of the coefficients KA and Am (m=3 . . . 20) in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric coefficients.

In the basic lens data, the data about specification, the data about surface distances variable during zooming, and the data about aspheric coefficients, a degree is used as a unit of an angle, and mm is used as a unit of a length, but appropriate different units may be used since the optical system can be used even in a case where the system is enlarged or reduced in proportion.

TABLE 1

Example 1·Lens Data (n and ν at d Line)

| Surface Number | Radius of Curvature | Surface Distance | n | ν |
|---|---|---|---|---|
| 1 | 98.90193 | 1.599 | 1.85896 | 22.73 |
| 2 | 58.57248 | 8.683 | 1.72916 | 54.68 |
| 3 | 329.36885 | 0.335 | | |
| 4 | 60.24169 | 5.933 | 1.72916 | 54.68 |
| 5 | 159.25126 | DD[5] | | |
| *6 | 172.14995 | 0.699 | 1.85135 | 40.10 |
| *7 | 11.64587 | 6.773 | | |
| 8 | −41.28183 | 0.569 | 1.88300 | 40.76 |
| 9 | 123.35740 | 0.249 | | |
| 10 | 29.03790 | 4.456 | 1.95906 | 17.47 |
| 11 | −260.74776 | DD[11] | | |
| *12 | 94.43661 | 1.043 | 1.74330 | 49.33 |
| *13 | 23.92253 | DD[13] | | |
| *14 | 16.91660 | 5.237 | 1.62263 | 58.16 |
| *15 | −35.64431 | 0.912 | | |

TABLE 1-continued

Example 1•Lens Data (n and ν at d Line)

| Surface Number | Radius of Curvature | Surface Distance | n | ν |
|---|---|---|---|---|
| 16(Stop) | ∞ | 2.800 | | |
| 17 | 27.34956 | 4.885 | 1.59522 | 67.73 |
| 18 | −16.29082 | 1.197 | 1.92286 | 18.90 |
| 19 | −43.17081 | 2.018 | | |
| 20 | −300.83907 | 2.017 | 1.95906 | 17.47 |
| 21 | −44.25518 | 0.461 | 1.76200 | 40.10 |
| 22 | 21.42676 | 1.998 | | |
| *23 | 85.23245 | 3.847 | 1.58313 | 59.46 |
| *24 | −28.08240 | 3.218 | | |
| 25 | −18.53438 | 1.032 | 1.62588 | 35.70 |
| 26 | −81.42896 | DD[26] | | |
| 27 | −146.62840 | 3.889 | 2.00100 | 29.13 |
| 28 | −38.46534 | 10.721 | | |
| 29 | ∞ | 2.150 | 1.54763 | 54.98 |
| 30 | ∞ | 1.310 | | |
| 31 | ∞ | 0.700 | 1.49784 | 54.98 |
| 32 | ∞ | 1.133 | | |

TABLE 2

Example 1•Specification (d Line)

| | WIDE | MIDDLE | TELE |
|---|---|---|---|
| Zoom Ratio | 1.0 | 2.5 | 4.7 |
| f | 16.500 | 41.006 | 77.765 |
| Bf | 15.020 | 15.020 | 15.020 |
| FNo. | 4.10 | 4.11 | 4.04 |
| 2ω[°] | 84.8 | 36.2 | 20.0 |

TABLE 3

Example 1•Variable Surface Distance

| | WIDE | MIDDLE | TELE |
|---|---|---|---|
| DD[5] | 0.461 | 21.998 | 36.308 |
| DD[11] | 10.200 | 3.714 | 4.521 |
| DD[13] | 5.328 | 3.090 | 0.430 |
| DD[26] | 0.977 | 15.317 | 25.877 |

TABLE 4

Example 1•Aspheric Coefficient

| Surface Number | 6 | 7 | 12 | 13 |
|---|---|---|---|---|
| KA | −2.0083118E+00 | 1.5654139E−01 | −4.0909552E+00 | 3.8316650E+00 |
| A3 | 0.0000000E+00 | 0.0000000E+00 | 0.0000000E+00 | 0.0000000E+00 |
| A4 | 7.5534894E−05 | 1.2539044E−04 | −5.7299348E−04 | −6.2798527E−04 |
| A5 | −9.2883707E−06 | −5.5935617E−06 | 1.9418574E−05 | 2.0359555E−05 |
| A6 | 2.5084410E−07 | −1.8957970E−06 | 6.4259934E−06 | 7.9346811E−06 |
| A7 | 5.1622741E−09 | 2.9378459E−08 | 6.5113528E−08 | −2.3939865E−07 |
| A8 | 7.5383371E−10 | 2.1930672E−08 | −9.2857710E−08 | −7.4198994E−08 |
| A9 | −8.4480514E−11 | −3.5897295E−09 | 6.0924589E−11 | −1.4889904E−09 |
| A10 | −7.4006341E−13 | 3.2995545E−11 | 1.8855007E−10 | 3.4593708E−10 |
| A11 | 3.3199491E−13 | 4.3570820E−11 | 4.0657130E−11 | 5.8011800E−11 |
| A12 | 6.5592361E−15 | −5.1863363E−12 | 3.7336016E−12 | 2.4286150E−12 |
| A13 | −2.2566788E−15 | 2.3237787E−13 | 4.6576096E−14 | −2.2544369E−13 |
| A14 | 6.5269643E−17 | −1.5323283E−15 | −2.1328413E−14 | −4.5386293E−14 |
| A15 | 6.3328072E−19 | 2.8644765E−16 | −7.0949674E−15 | −5.6234638E−15 |
| A16 | −1.4845297E−19 | −1.6022999E−17 | −1.4893999E−15 | −3.6145225E−16 |
| A17 | 1.1948366E−20 | 1.4576507E−17 | 5.7838906E−17 | 5.6059735E−17 |
| A18 | −2.8952807E−22 | −2.8921148E−18 | 2.3334582E−17 | 8.7024018E−18 |
| A19 | 4.3801531E−23 | 1.3019831E−19 | 9.4470253E−19 | 8.0092894E−19 |
| A20 | −2.4096667E−24 | 3.5764463E−22 | −2.1120875E−19 | −1.2979624E−19 |

| Surface Number | 14 | 15 | 23 | 24 |
|---|---|---|---|---|
| KA | −2.8531901E−01 | 2.3397215E+00 | 2.4891915E+00 | −5.0000090E+00 |
| A3 | 0.0000000E+00 | 0.0000000E+00 | 0.0000000E+00 | 0.0000000E+00 |
| A4 | 4.3222454E−06 | 4.1449022E−05 | −5.0753708E−05 | −2.4483850E−05 |
| A5 | 2.5774397E−06 | −2.8794700E−06 | 2.6883165E−06 | −4.7876500E−06 |
| A6 | −6.2823424E−07 | 7.6708317E−07 | −2.8641475E−06 | 1.3574474E−06 |
| A7 | 1.2369614E−07 | −6.0347324E−08 | 5.8946486E−07 | −2.6325204E−07 |
| A8 | −4.8451718E−09 | −5.3856253E−09 | −1.1244435E−07 | −2.4245966E−08 |
| A9 | −4.5112054E−10 | 1.6817166E−09 | 6.1055764E−09 | 7.9348495E−09 |
| A10 | −4.0880800E−11 | −3.9798962E−11 | 7.7872655E−10 | −4.7738589E−11 |
| A11 | 1.0523647E−11 | −1.9242162E−11 | −2.8950436E−11 | −8.6054348E−11 |
| A12 | 6.0742044E−14 | 1.3337315E−12 | −2.7579738E−11 | −1.1580113E−11 |
| A13 | 6.3674841E−14 | 5.1476939E−14 | 2.9501867E−12 | 2.2744276E−12 |
| A14 | −2.8835118E−14 | −8.7516777E−15 | −2.9572046E−13 | 3.3570612E−13 |
| A15 | 3.9742353E−15 | 4.5703720E−15 | 3.5609351E−14 | −4.1708202E−14 |
| A16 | −2.0057640E−16 | −5.6621862E−16 | −7.0113998E−15 | 5.6683642E−15 |
| A17 | 5.5456052E−18 | −5.6218441E−18 | 2.5010820E−16 | 5.8758790E−16 |
| A18 | −3.2840782E−18 | 3.7822516E−18 | 2.2025883E−16 | −6.8968309E−17 |
| A19 | 3.6522812E−19 | −3.2752419E−19 | 2.2480346E−17 | −2.1370945E−17 |
| A20 | −7.2289011E−21 | 2.0436631E−20 | −6.4230613E−18 | 2.1609930E−18 |

Figure 6:
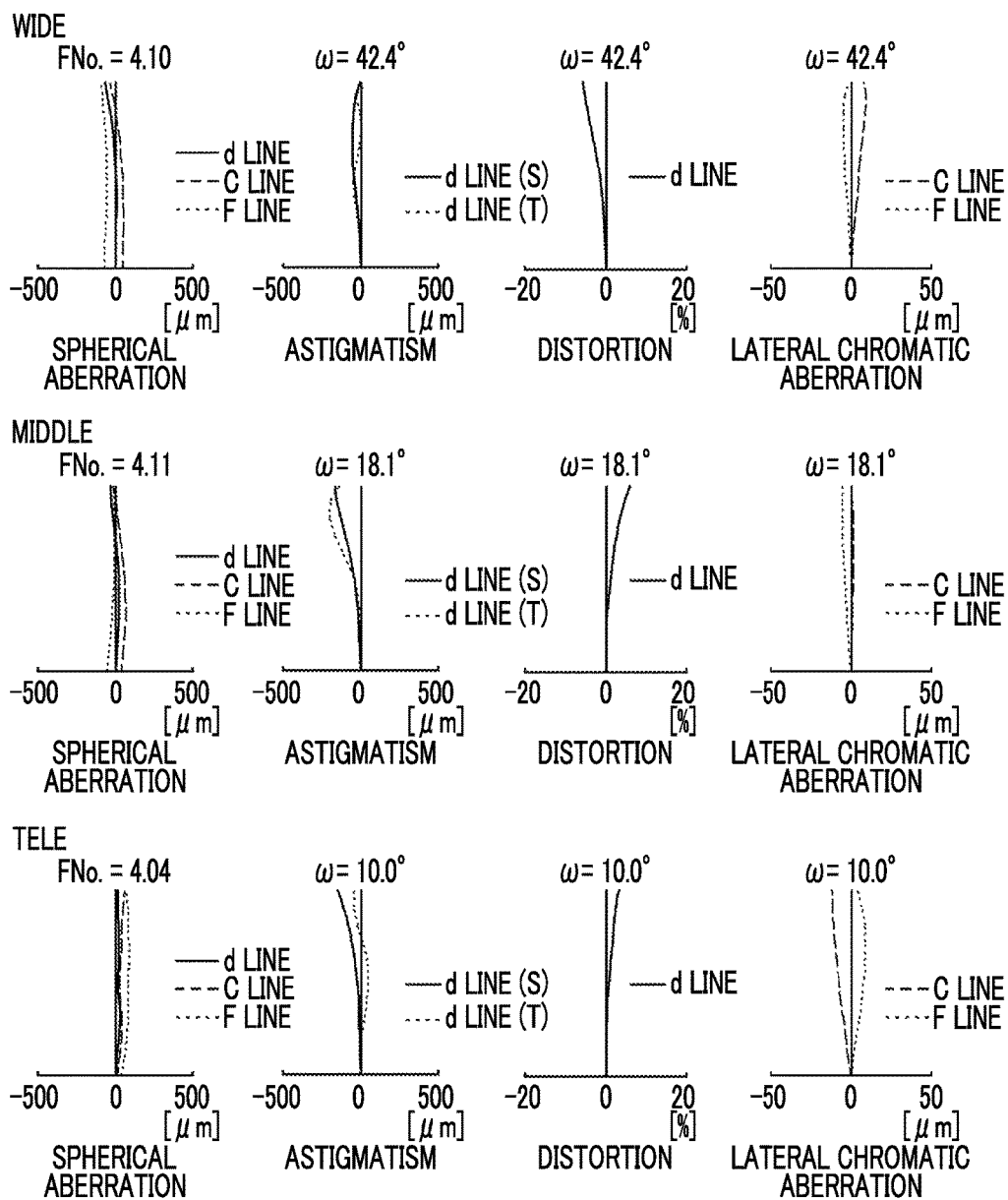
FIG. 6 is a diagram of aberrations of the zoom lens of Example 1 of the present invention.

FIG. 6 shows aberration diagrams of the zoom lens of Example 1. In addition, in order from the upper left side of FIG. 6, spherical aberration, astigmatism, distortion, and lateral chromatic aberration in a case where the object at infinity is in focus at the wide-angle end (WIDE) are shown. In order from the middle left side of FIG. 6, spherical aberration, astigmatism, distortion, and lateral chromatic aberration in a case where the object at infinity is in focus at the middle position (MIDDLE) are shown. In order from the lower left side of FIG. 6, spherical aberration, astigmatism, distortion, and lateral chromatic aberration in a case where the object at infinity is in focus at the telephoto end (TELE) are shown.

The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In the spherical aberration diagram, FNo. means an F number. In the other aberration diagrams, ω means a half angle of view.

Figure 11:
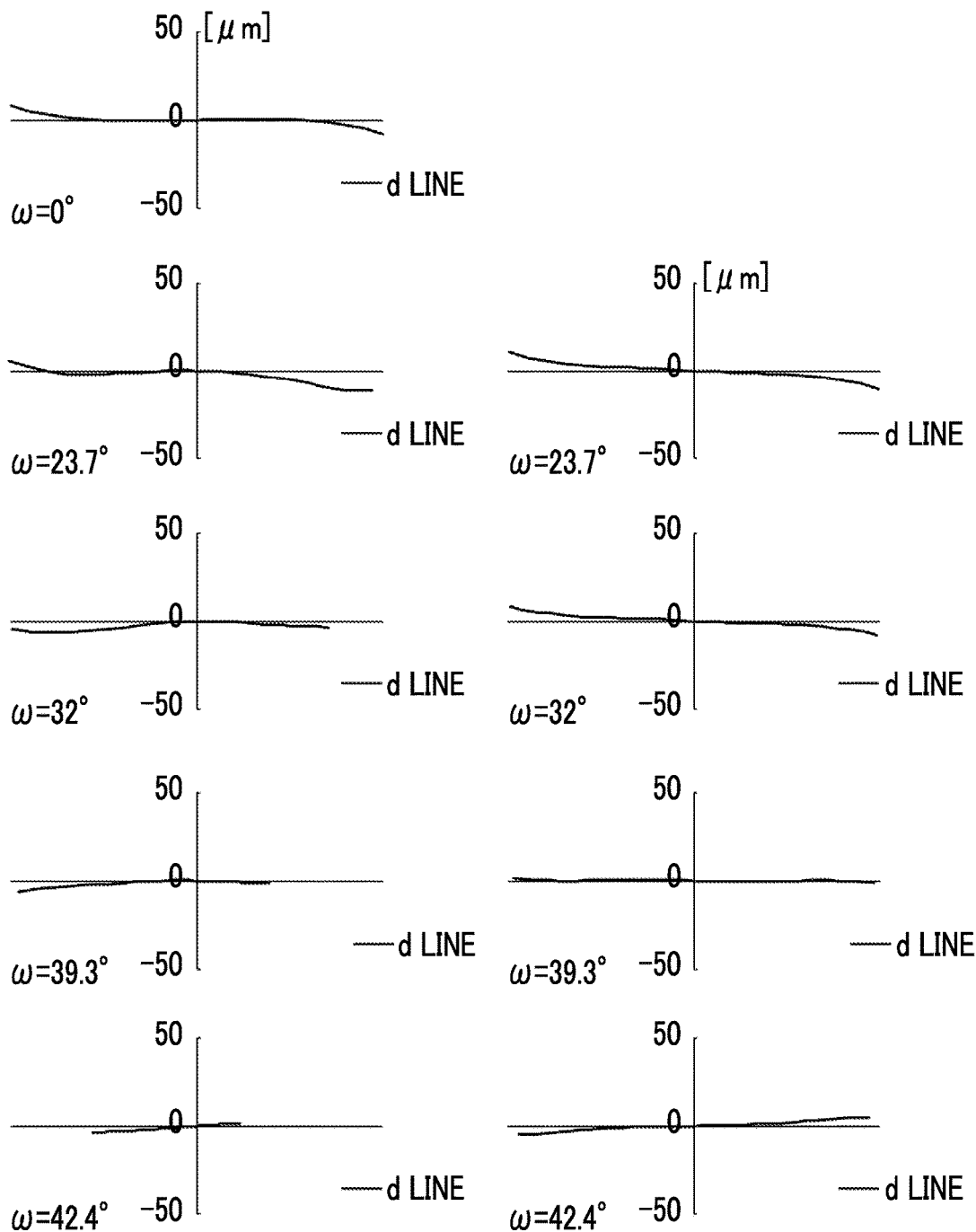
FIG. 11 is a diagram of lateral aberrations at the wide-angle end of the zoom lens of Example 1 of the present invention.
Figure 12:
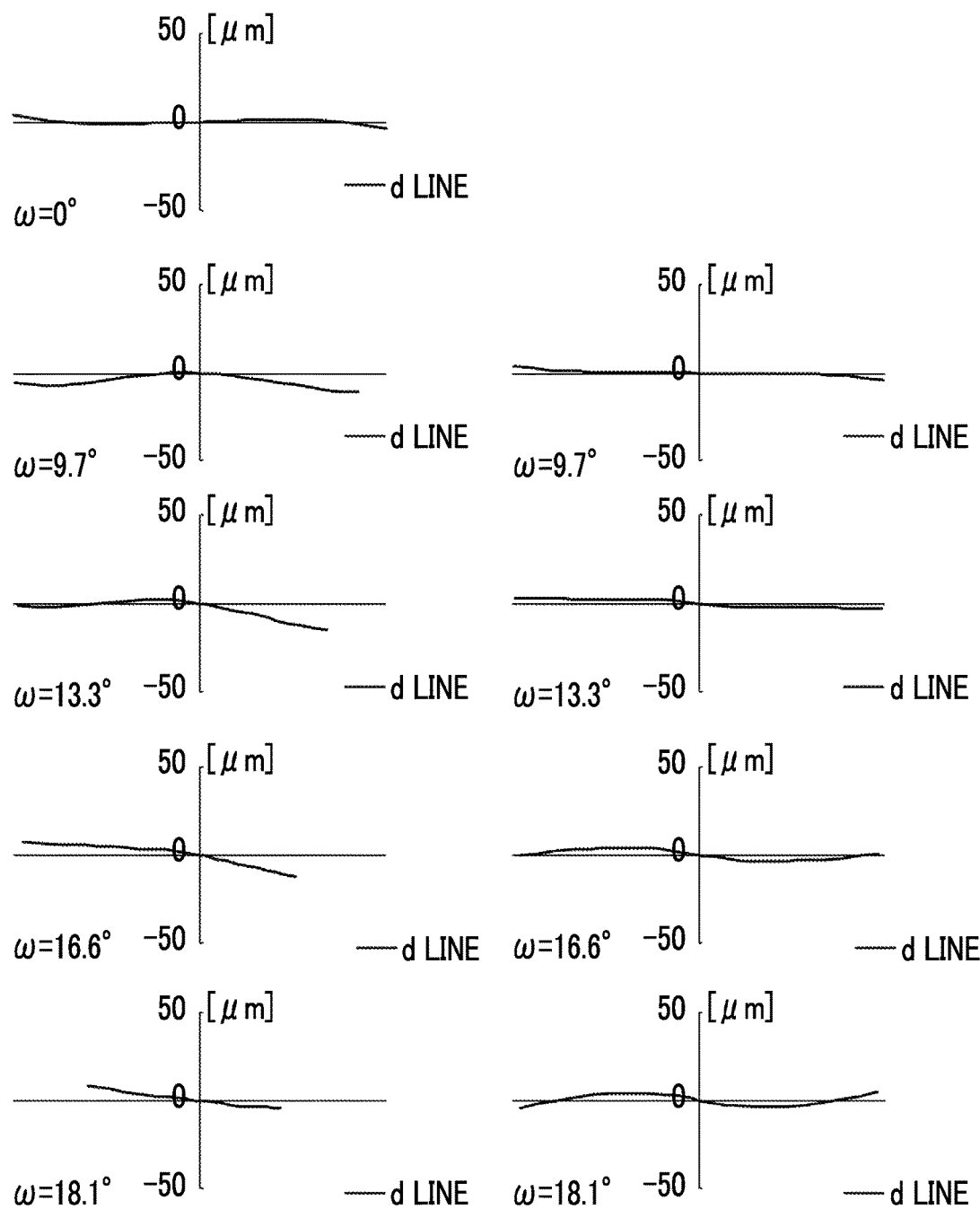
FIG. 12 is a diagram of lateral aberrations of the zoom lens of Example 1 of the present invention at the middle position.
Figure 13:
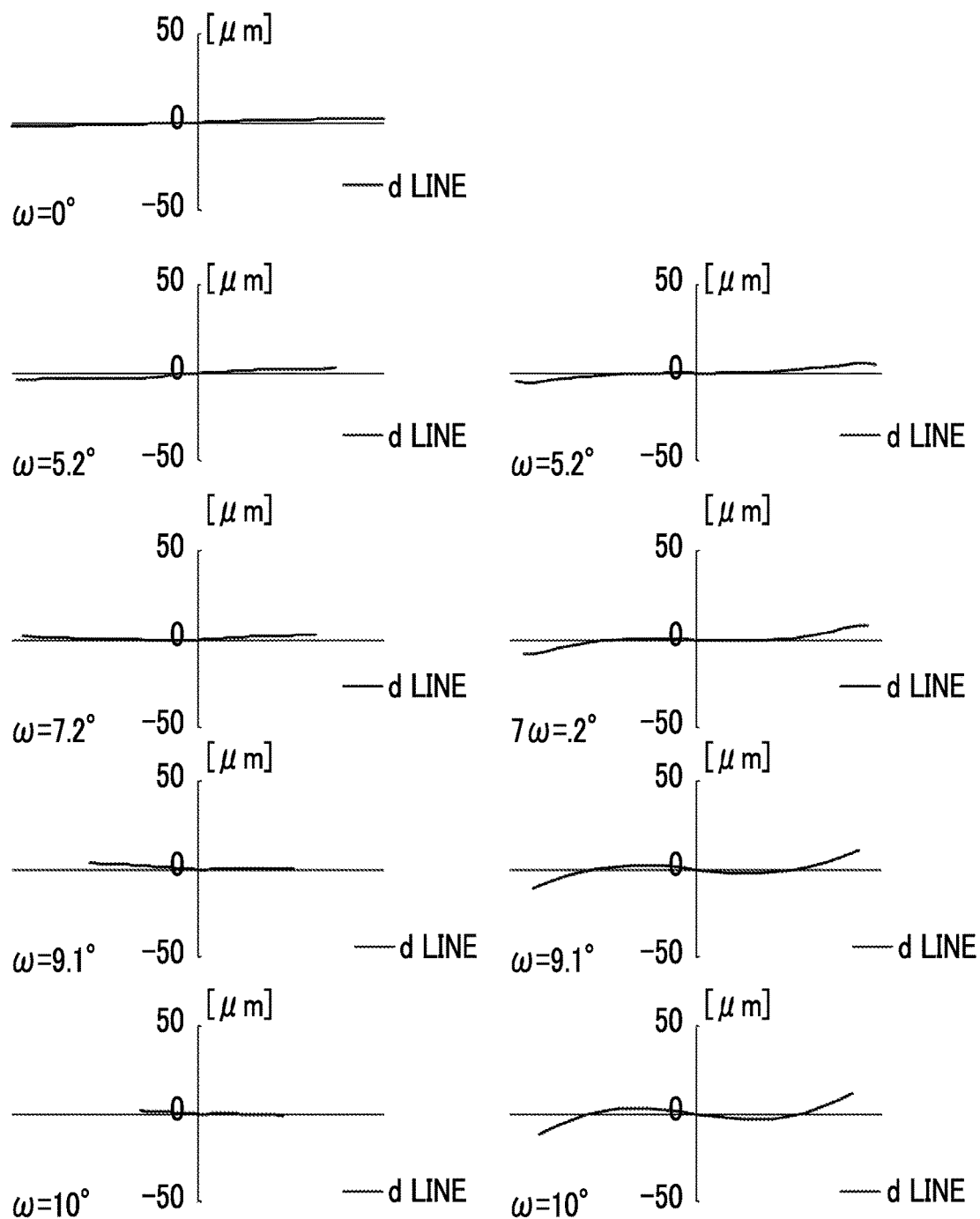
FIG. 13 is a diagram of lateral aberrations of the zoom lens of Example 1 of the present invention at the telephoto end.

FIG. 11 shows a diagram of lateral aberrations in a case where the object at infinity is in focus at the wide-angle end (WIDE) of the zoom lens of Example 1, FIG. 12 shows a diagram of lateral aberrations in a case where the object at infinity is in focus at the middle position (MIDDLE) thereof, and FIG. 13 shows a diagram of lateral aberrations in a case where the object at infinity is in focus at the telephoto end (TELE) thereof. Each diagram of lateral aberrations shows aberrations arranged in two columns on the left and right, where aberrations in the left column are aberrations in the tangential direction and aberrations in the right column are aberrations in the sagittal direction. In each diagram of lateral aberrations, aberration at the center of the image plane is shown at the uppermost stage, and aberrations at the respective image heights shown in the drawing are shown at the second and following stages.

In the description of Example 1, reference signs, meanings, and description methods of the respective data pieces are the same as those in the following examples unless otherwise noted. Therefore, in the following description, repeated description will be omitted.

Figure 2:
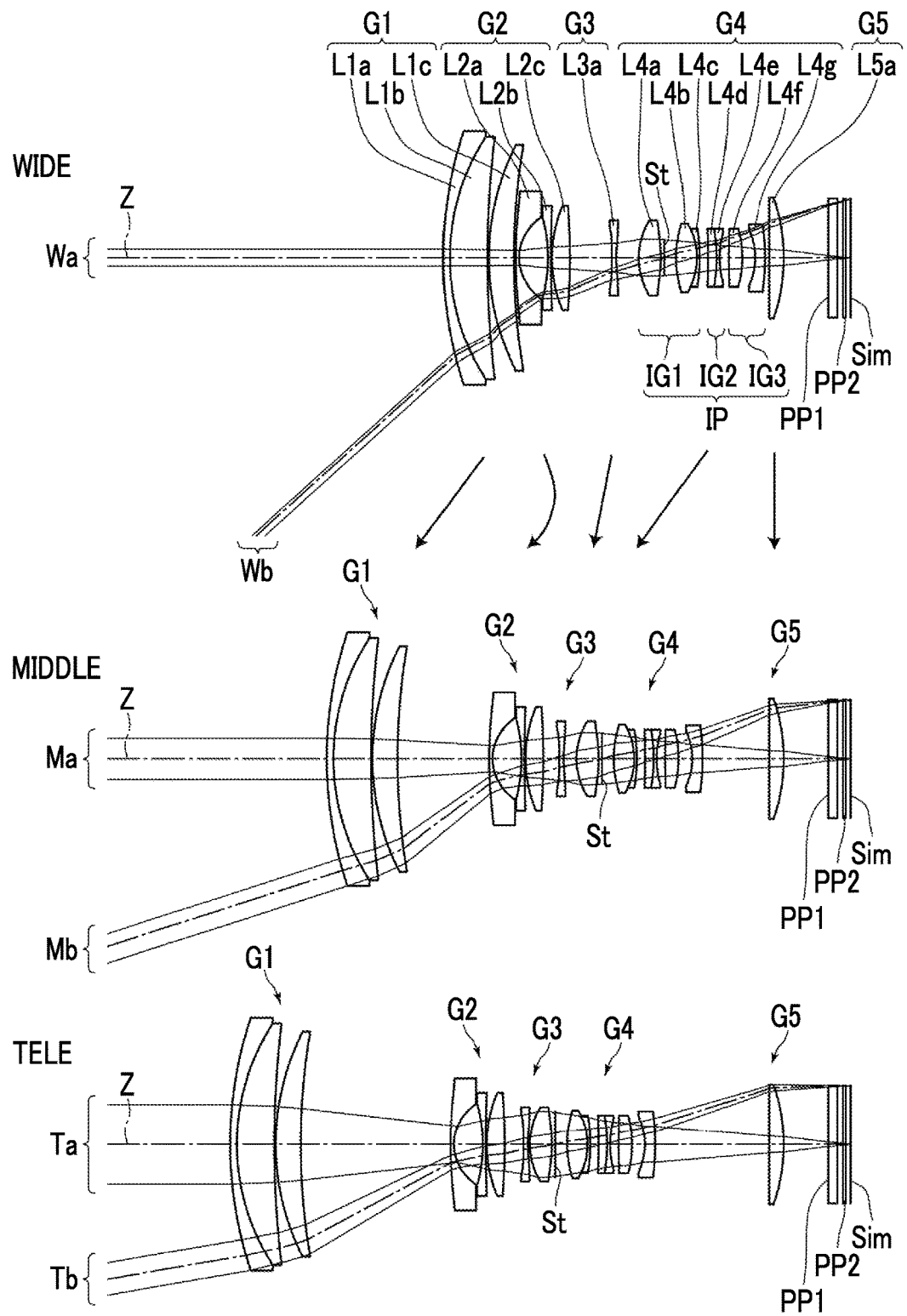
FIG. 2 is a cross-sectional view illustrating a lens configuration of a zoom lens of Example 2 of the present invention.
Figure 7:
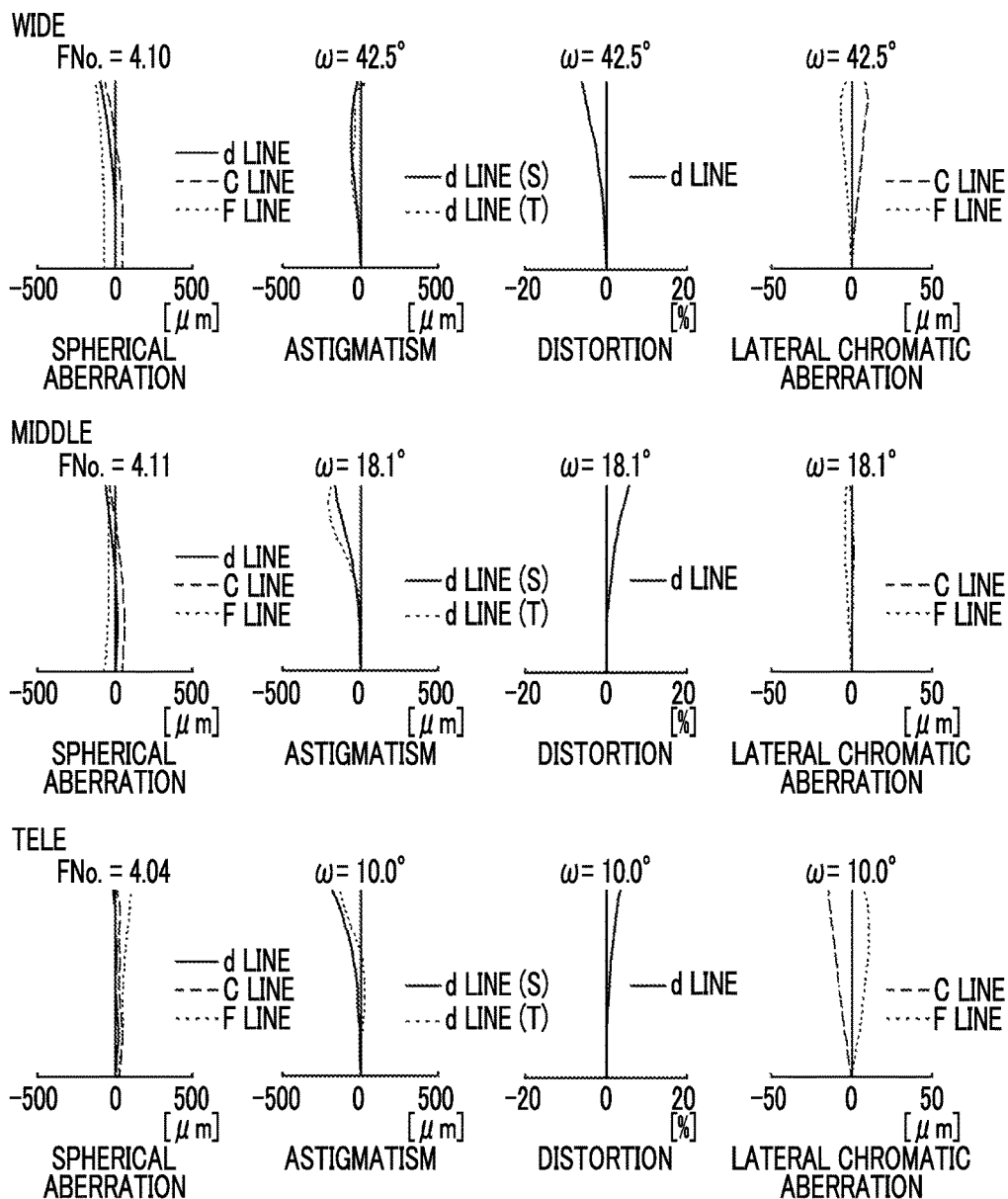
FIG. 7 is a diagram of aberrations of the zoom lens of Example 2 of the present invention.
Figure 14:
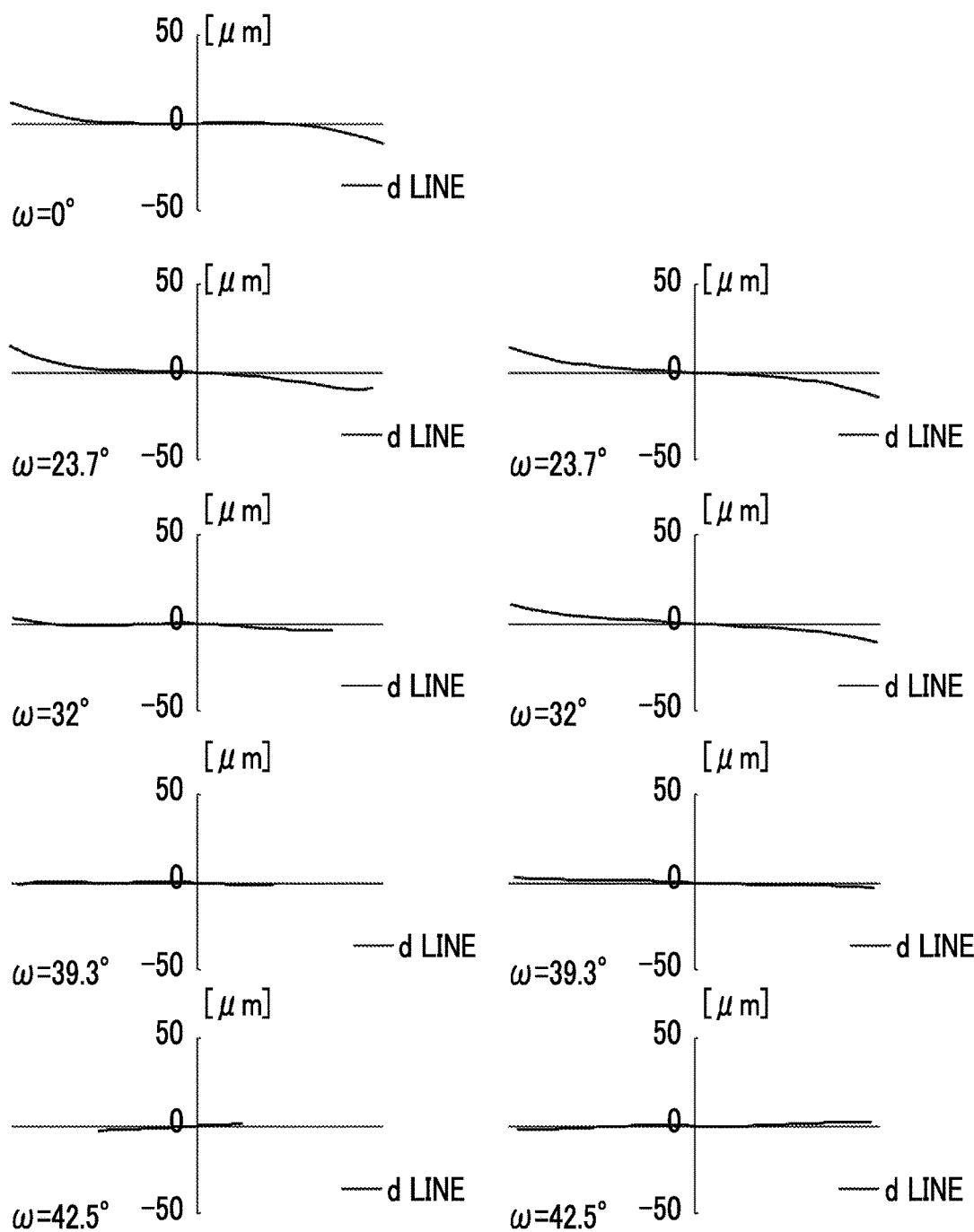
FIG. 14 is a diagram of lateral aberrations of the zoom lens of Example 2 of the present invention at the wide-angle end.
Figure 15:
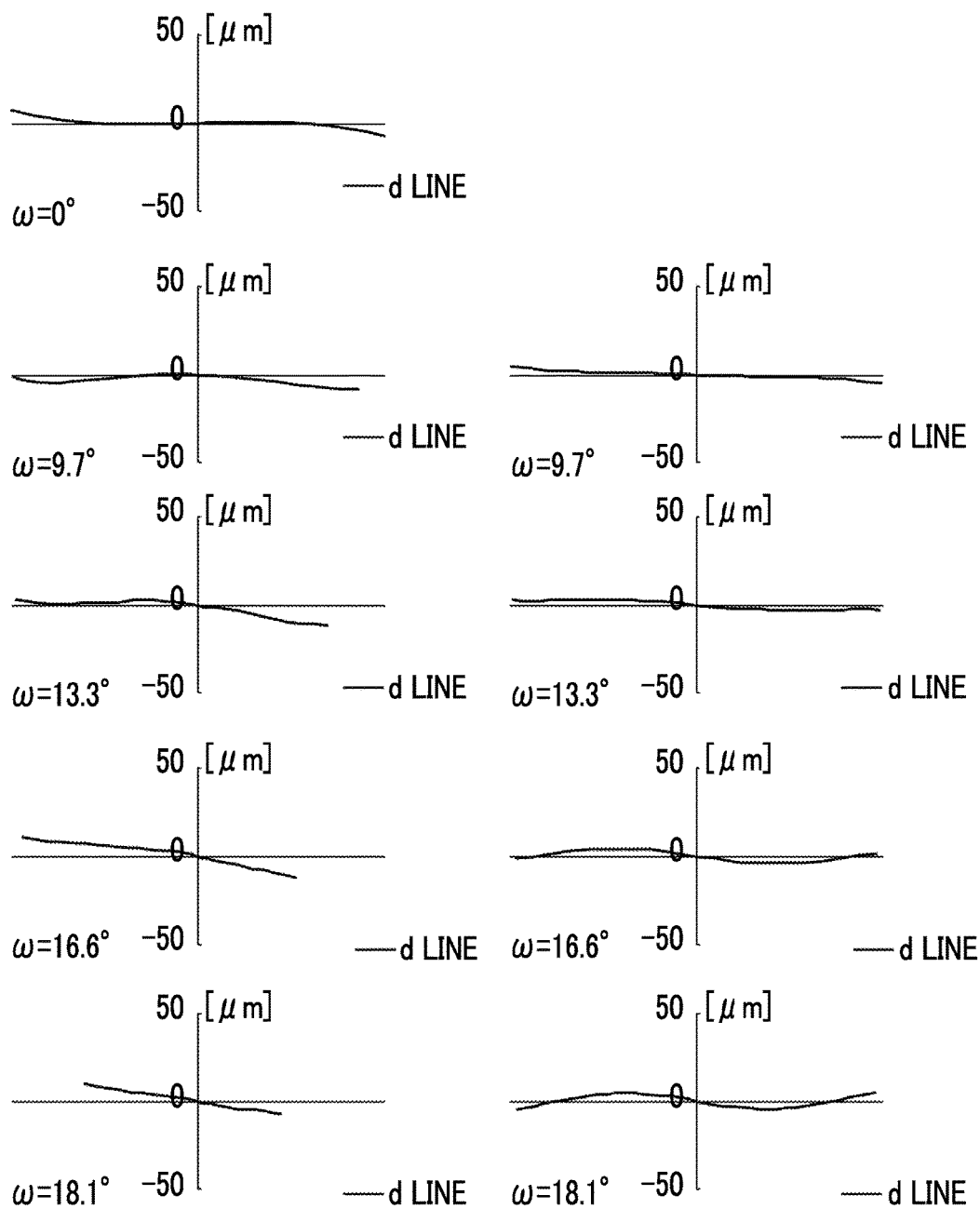
FIG. 15 is a diagram of lateral aberrations of the zoom lens of Example 2 of the present invention at the middle position.
Figure 16:
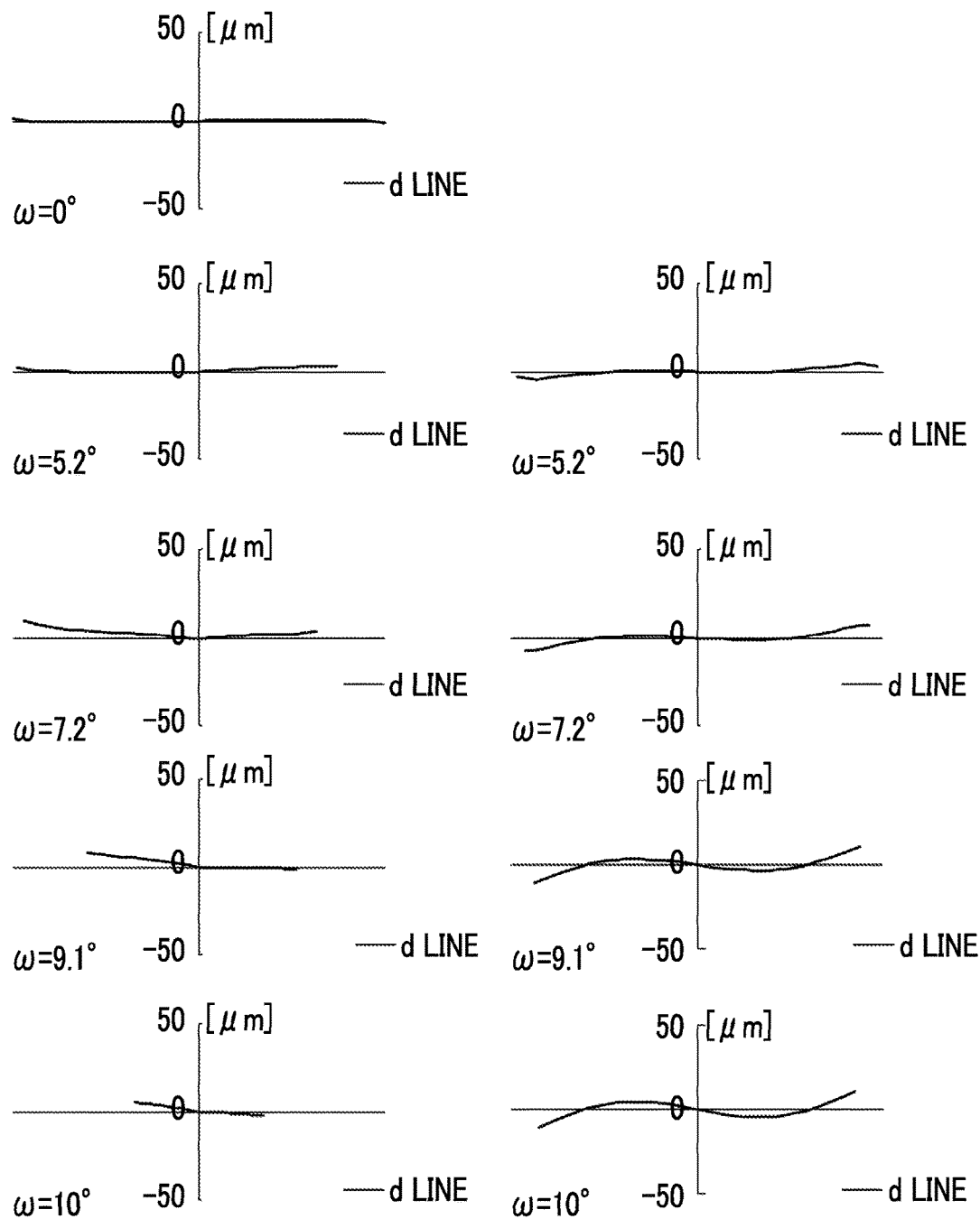
FIG. 16 is a diagram of lateral aberrations of the zoom lens of Example 2 of the present invention at the telephoto end.

Next, a zoom lens of Example 2 will be described. FIG. 2 is a cross-sectional view illustrating a lens configuration of the zoom lens of Example 2. The number of lenses of each group of the zoom lens of Example 2 is the same as that of Example 1. Table 5 shows lens data of the zoom lens of Example 2, Table 6 shows data about specification, Table 7 shows surface distances which are variable during zooming, and Table 8 shows data about aspheric coefficients thereof. FIG. 7 shows a diagram of aberrations, FIG. 14 shows a diagram of lateral aberrations in a case where the object at infinity is in focus at the wide-angle end (WIDE) of the zoom lens, FIG. 15 shows a diagram of lateral aberrations in a case where the object at infinity is in focus at the middle position (MIDDLE) thereof, and FIG. 16 shows a diagram of lateral aberrations in a case where the object at infinity is in focus at the telephoto end (TELE) thereof.

TABLE 5

Example 2•Lens Data (n and ν at d Line)

| Surface Number | Radius of Curvature | Surface Distance | n | ν |
|---|---|---|---|---|
| 1 | 97.13652 | 1.589 | 1.85896 | 22.73 |
| 2 | 53.80591 | 8.968 | 1.72916 | 54.68 |
| 3 | 244.91302 | 0.326 | | |
| 4 | 60.37398 | 5.974 | 1.81464 | 46.54 |
| 5 | 164.62029 | DD[5] | | |
| *6 | 179.92179 | 0.799 | 1.85135 | 40.10 |
| *7 | 11.60839 | 6.873 | | |
| 8 | −36.68898 | 0.714 | 1.88300 | 40.76 |
| 9 | 361.09159 | 0.234 | | |
| 10 | 32.48755 | 4.251 | 1.95906 | 17.47 |
| 11 | −169.77260 | DD[11] | | |
| *12 | 107.33744 | 1.055 | 1.74330 | 49.33 |
| *13 | 24.13566 | DD[13] | | |
| *14 | 16.74813 | 5.264 | 1.62263 | 58.16 |
| *15 | −36.13258 | 0.821 | | |
| 16(Stop) | ∞ | 2.800 | | |
| 17 | 27.18067 | 4.873 | 1.59522 | 67.73 |
| 18 | −16.32740 | 0.636 | 1.92286 | 18.90 |
| 19 | −44.41501 | 1.980 | | |
| 20 | −208.22372 | 2.050 | 1.95906 | 17.47 |
| 21 | −39.90988 | 0.713 | 1.76200 | 40.10 |
| 22 | 22.36812 | 1.998 | | |
| *23 | 88.57659 | 3.209 | 1.58313 | 59.46 |
| *24 | −28.42502 | 3.115 | | |
| 25 | −16.04242 | 2.477 | 1.57840 | 40.30 |
| 26 | −59.79531 | DD[26] | | |
| 27 | 2709.47010 | 3.481 | 1.88775 | 39.23 |
| 28 | −44.59036 | 10.684 | | |
| 29 | ∞ | 2.150 | 1.54763 | 54.98 |
| 30 | ∞ | 1.310 | | |
| 31 | ∞ | 0.700 | 1.49784 | 54.98 |
| 32 | ∞ | 1.135 | | |

TABLE 6

Example 2•Specification (d Line)

| | WIDE | MIDDLE | TELE |
|---|---|---|---|
| Zoom Ratio | 1.0 | 2.5 | 4.7 |
| f | 16.500 | 41.006 | 77.766 |
| Bf | 14.985 | 14.985 | 14.985 |
| FNo. | 4.10 | 4.11 | 4.04 |
| 2ω[°] | 85.0 | 36.2 | 20.0 |

TABLE 7

Example 2•Variable Surface Distance

| | WIDE | MIDDLE | TELE |
|---|---|---|---|
| DD[5] | 0.443 | 21.765 | 35.591 |
| DD[11] | 9.991 | 3.763 | 4.479 |
| DD[13] | 5.396 | 3.072 | 0.445 |
| DD[26] | 0.983 | 15.844 | 26.976 |

TABLE 8

Example 2•Aspheric Coefficient

| Surface Number | 6 | 7 | 12 | 13 |
|---|---|---|---|---|
| KA | 4.3229241E+00 | 1.2976002E−01 | 2.6529883E+00 | 3.9900188E+00 |
| A3 | 0.0000000E+00 | 0.0000000E+00 | 0.0000000E+00 | 0.0000000E+00 |
| A4 | 7.7550727E−05 | 1.2528040E−04 | −5.7779094E−04 | −6.3089944E−04 |
| A5 | −9.2533072E−06 | −5.0934588E−06 | 1.9849023E−05 | 2.0274390E−05 |
| A6 | 2.5256423E−07 | −2.0061886E−07 | 6.4043200E−06 | 7.9796423E−06 |
| A7 | 4.9384505E−09 | 1.9195236E−08 | 3.7282497E−08 | −2.5327161E−07 |
| A8 | 7.3011539E−10 | 2.3124845E−08 | −8.7914464E−08 | −7.3661669E−08 |
| A9 | −8.4845035E−11 | −3.5961980E−09 | 1.1066457E−12 | −1.3757677E−09 |
| A10 | −7.3762995E−13 | 3.1573377E−11 | 1.9331963E−10 | 3.5664120E−10 |
| A11 | 3.3170953E−13 | 4.3250021E−11 | 3.9564522E−11 | 5.8080120E−11 |
| A12 | 6.7204285E−15 | −5.2012173E−12 | 3.3728684E−12 | 2.3354975E−12 |
| A13 | −2.2365999E−15 | 2.3841617E−13 | 6.0134925E−14 | −2.5265167E−13 |
| A14 | 6.6111688E−17 | −1.5647479E−15 | −1.9939214E−14 | −4.5567338E−14 |
| A15 | 6.0538213E−19 | 2.7907429E−16 | −7.0304904E−15 | −5.7405417E−15 |
| A16 | −1.4876276E−19 | −1.7472929E−17 | −1.5455879E−15 | −3.3556249E−16 |
| A17 | 1.2015456E−20 | 1.4239894E−17 | 6.1241140E−17 | 5.6161880E−17 |
| A18 | −3.4474889E−22 | −2.8503806E−18 | 2.3635195E−17 | 8.9924291E−18 |
| A19 | 4.5315286E−23 | 1.2886851E−19 | 9.8870946E−19 | 8.0872066E−19 |
| A20 | −2.3774436E−24 | 3.8939313E−22 | −2.1678024E−19 | −1.3296534E−19 |

| Surface Number | 14 | 15 | 23 | 24 |
|---|---|---|---|---|
| KA | −1.9436869E−01 | 1.0952265E+00 | −5.0000088E+00 | −5.0000054E+00 |
| A3 | 0.0000000E+00 | 0.0000000E+00 | 0.0000000E+00 | 0.0000000E+00 |
| A4 | 7.8588153E−06 | 3.9685502E−05 | −3.7541666E−05 | −8.8801690E−06 |
| A5 | 1.6792251E−06 | −3.1309309E−06 | 5.7260604E−06 | −6.0505629E−06 |
| A6 | −5.8443310E−07 | 7.8106003E−07 | −3.6048247E−06 | 1.6900798E−06 |
| A7 | 1.2972603E−07 | −5.5802478E−08 | 6.3582772E−07 | −2.8919028E−07 |
| A8 | −5.2672711E−09 | −6.5517697E−09 | −1.0451989E−07 | −2.6754285E−08 |
| A9 | −5.0786013E−10 | 1.7404813E−09 | 6.1220687E−09 | 7.9667492E−09 |
| A10 | −4.0749763E−11 | −4.3660392E−11 | 5.9628775E−10 | −6.6697833E−11 |
| A11 | 1.0386794E−11 | −1.9092351E−11 | −4.7862189E−11 | −8.3333447E−11 |
| A12 | 6.5630717E−15 | 1.1935800E−12 | −3.0995852E−11 | −1.0371763E−11 |
| A13 | 5.9911585E−14 | 5.6738802E−14 | 2.2950849E−12 | 1.6010670E−12 |
| A14 | −2.5718305E−14 | −6.4782670E−15 | −3.2322436E−13 | 6.2700623E−14 |
| A15 | 3.9028504E−15 | 4.5027834E−15 | 1.5009711E−13 | −3.6504276E−14 |
| A16 | −2.0578067E−16 | −5.7174237E−16 | −6.3528923E−15 | 6.3517749E−15 |
| A17 | 5.2042266E−18 | −7.1984735E−18 | −1.9227931E−15 | 6.2464889E−16 |
| A18 | −3.4511211E−18 | 4.0442353E−18 | 9.2519242E−17 | −9.7910245E−17 |
| A19 | 3.6749122E−19 | −3.4068440E−19 | 3.8106195E−17 | −2.2378569E−17 |
| A20 | −6.5787211E−21 | 1.9527554E−20 | −4.7470164E−18 | 2.4348194E−18 |

Figure 3:
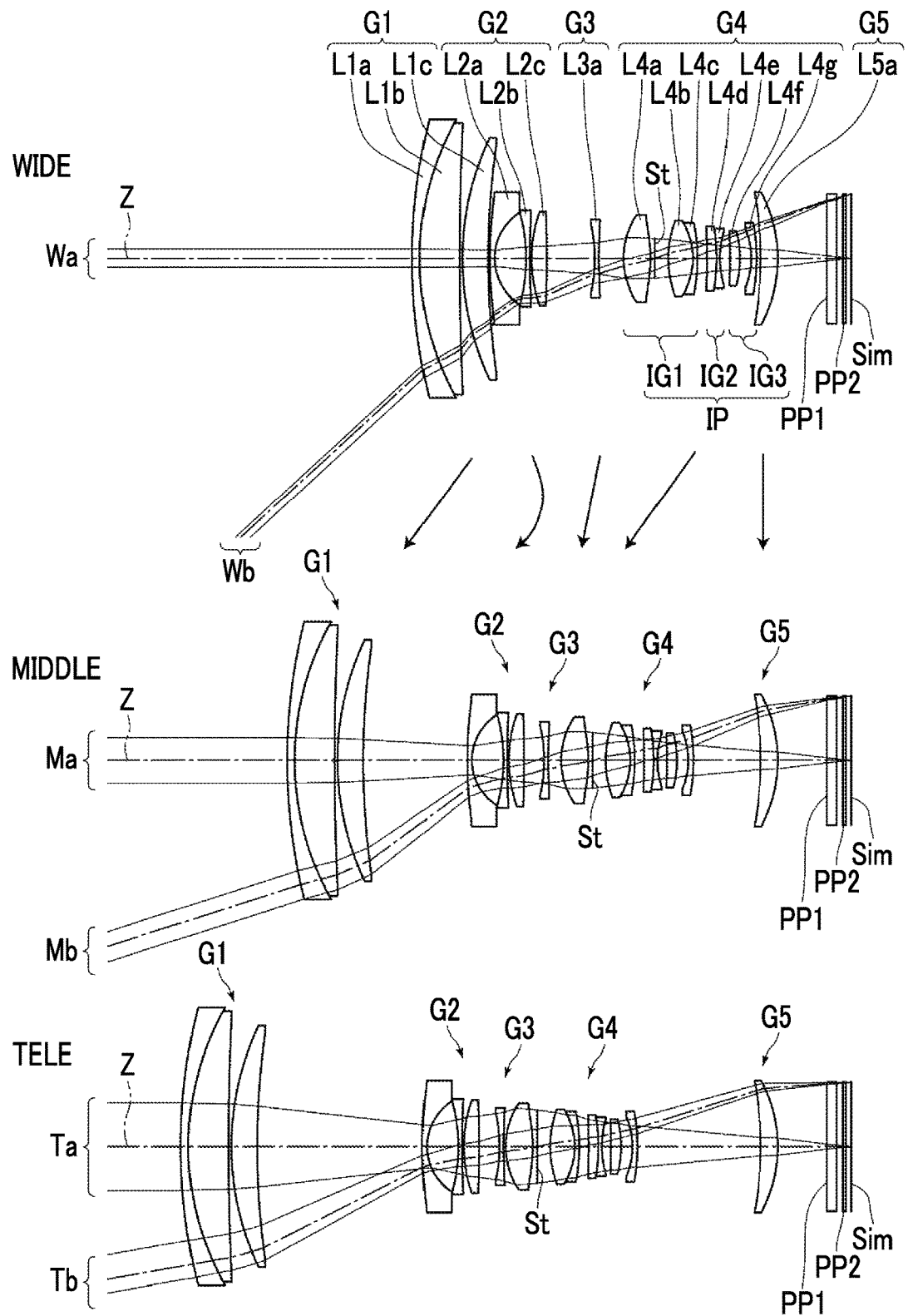
FIG. 3 is a cross-sectional view illustrating a lens configuration of a zoom lens of Example 3 of the present invention.
Figure 8:
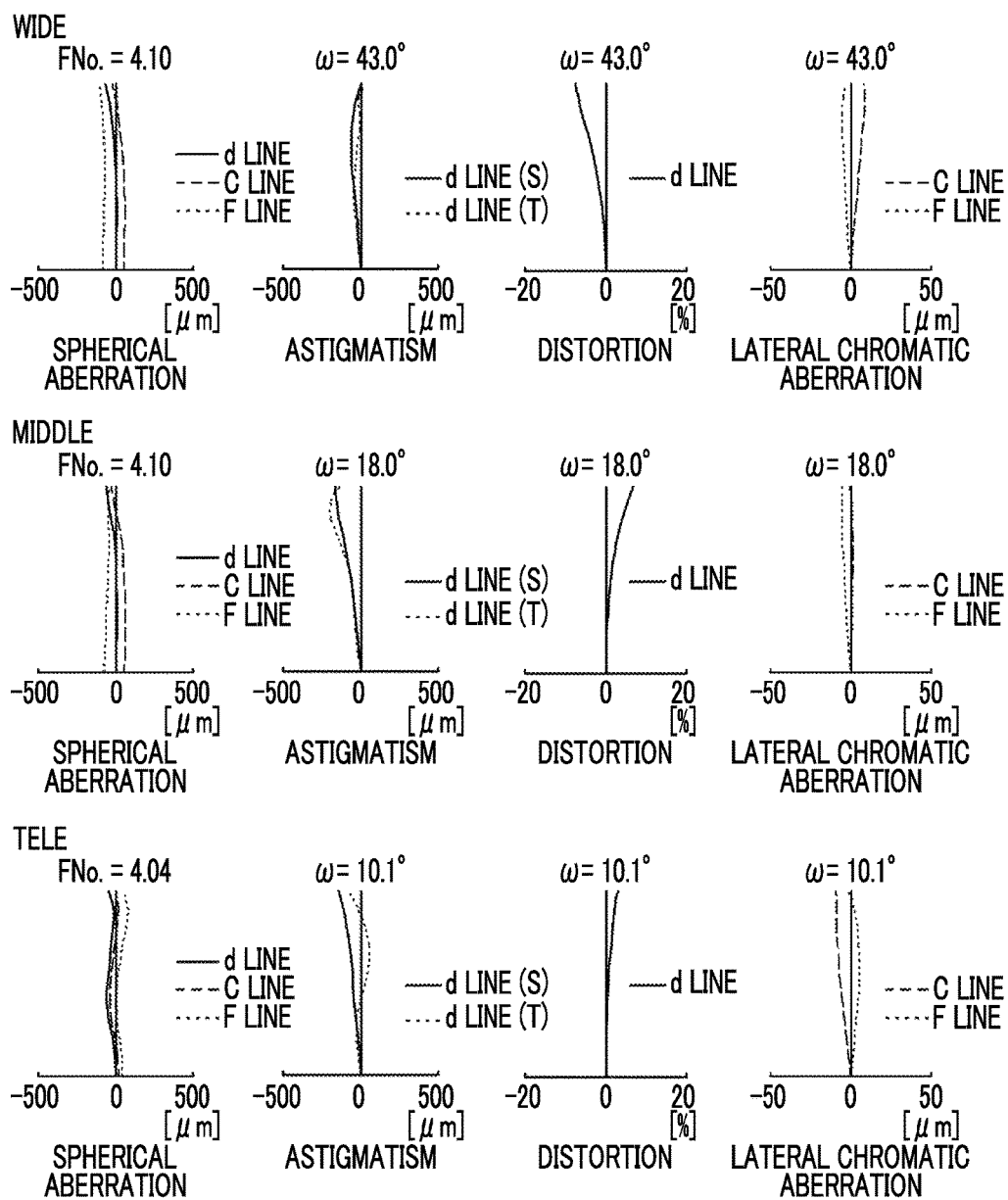
FIG. 8 is a diagram of aberrations of the zoom lens of Example 3 of the present invention.
Figure 17:
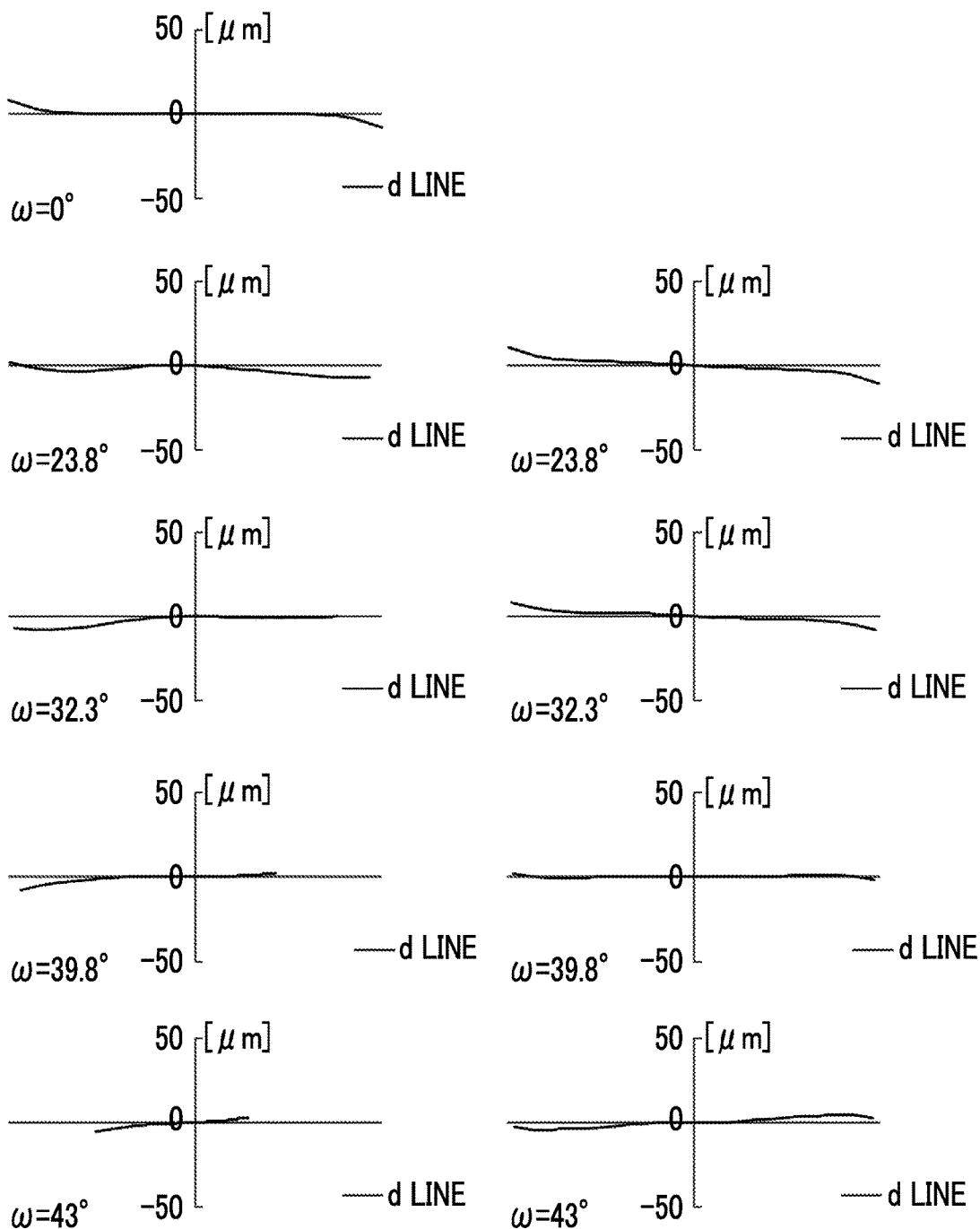
FIG. 17 is a diagram of lateral aberrations of the zoom lens of Example 3 of the present invention at the wide-angle end.
Figure 18:
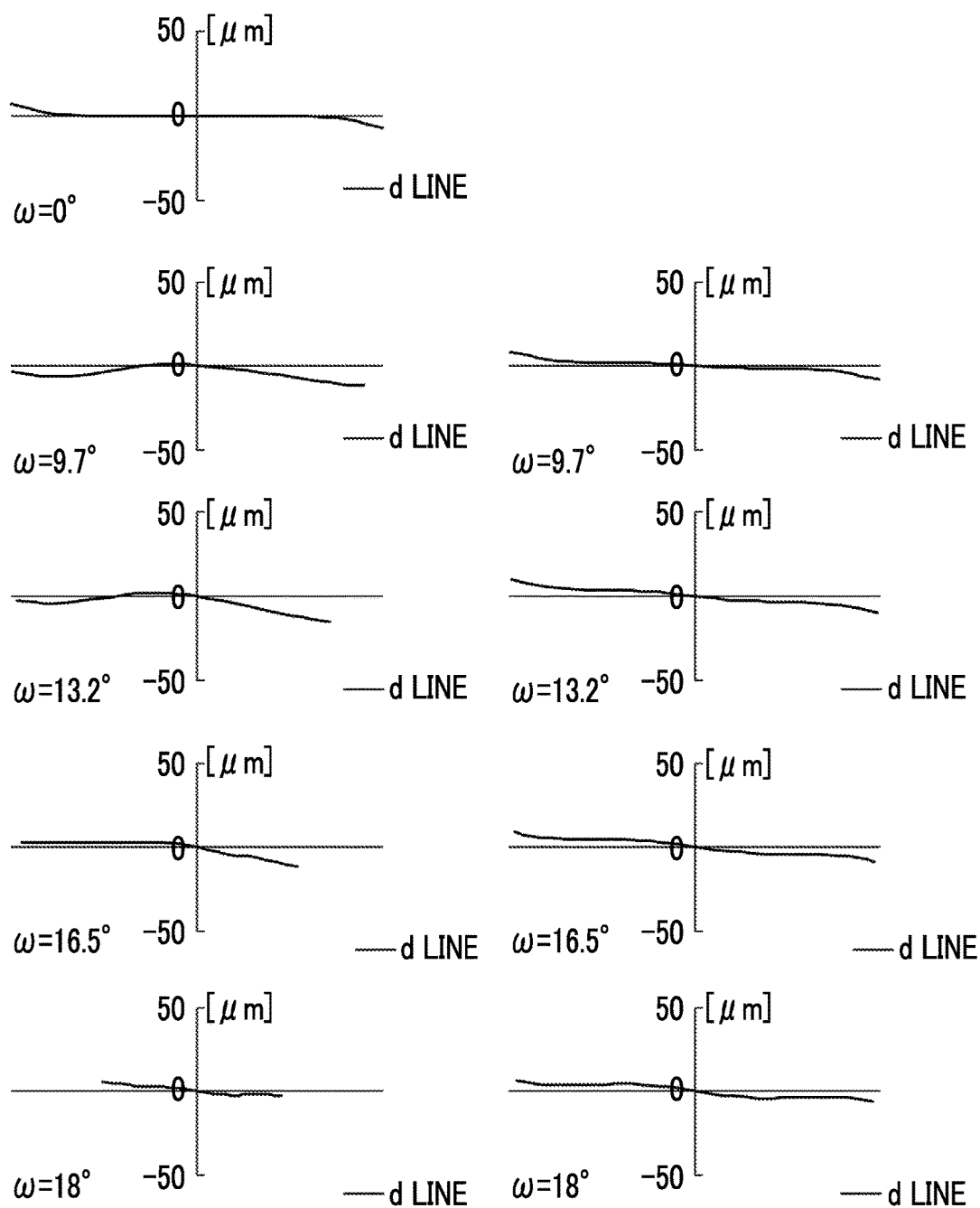
FIG. 18 is a diagram of lateral aberrations of the zoom lens of Example 3 of the present invention at the middle position.
Figure 19:
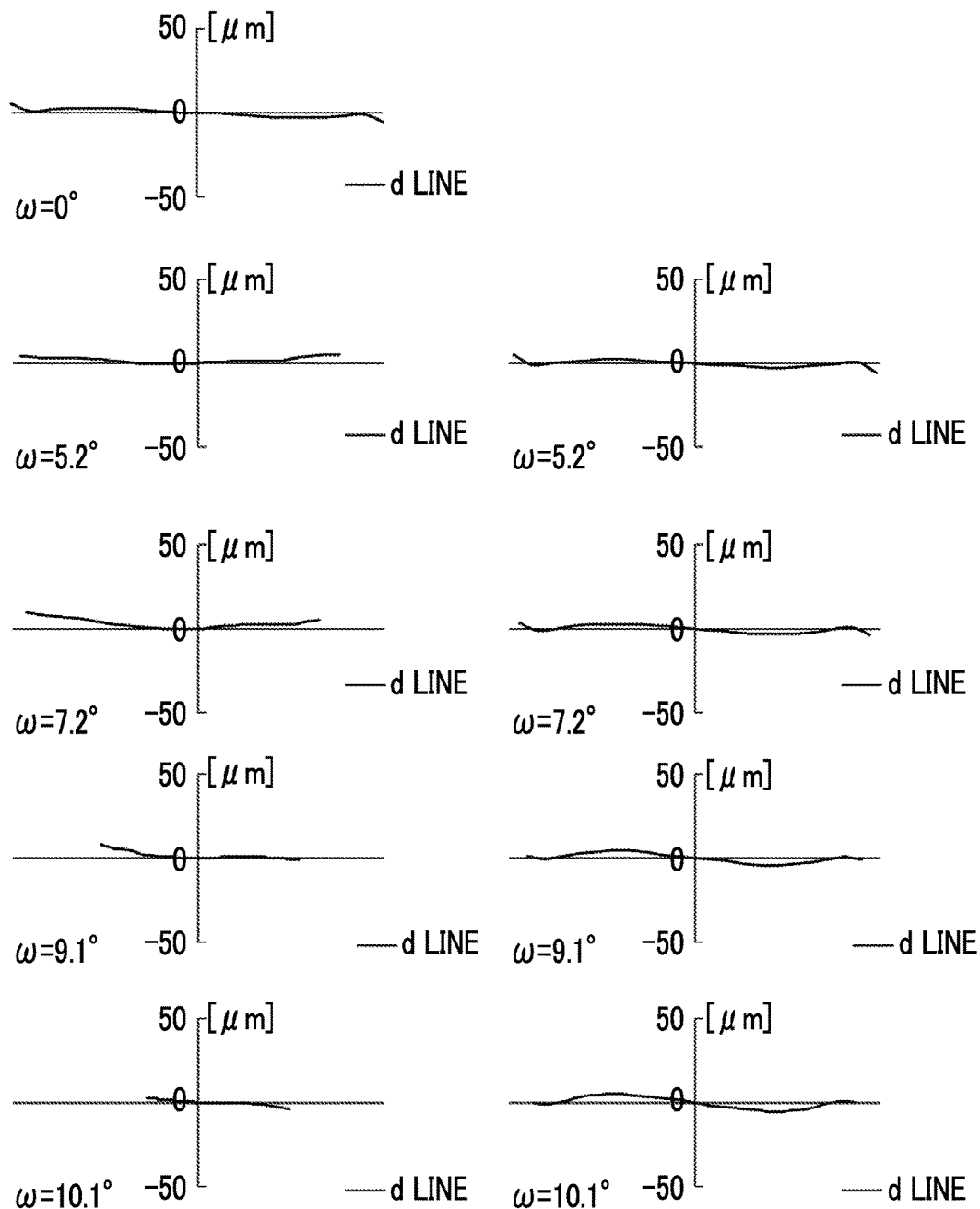
FIG. 19 is a diagram of lateral aberrations of the zoom lens of Example 3 of the present invention at the telephoto end.

Next, a zoom lens of Example 3 will be described. FIG. 3 is a cross-sectional view illustrating a lens configuration of the zoom lens of Example 3. The number of lenses of each group of the zoom lens of Example 3 is the same as that of Example 1. Table 9 shows lens data of the zoom lens of Example 3, Table 10 shows data about specification, Table 11 shows surface distances which are variable during zooming, and Table 12 shows data about aspheric coefficients thereof. FIG. 8 shows a diagram of aberrations, FIG. 17 shows a diagram of lateral aberrations in a case where the object at infinity is in focus at the wide-angle end (WIDE) of the zoom lens, FIG. 18 shows a diagram of lateral aberrations in a case where the object at infinity is in focus at the middle position (MIDDLE) thereof, and FIG. 19 shows a diagram of lateral aberrations in a case where the object at infinity is in focus at the telephoto end (TELE) thereof.

TABLE 9

Example 3•Lens Data (n and ν at d Line)

| Surface Number | Radius of Curvature | Surface Distance | n | ν |
|---|---|---|---|---|
| 1 | 126.32067 | 1.625 | 1.85896 | 22.73 |
| 2 | 62.44734 | 8.698 | 1.72916 | 54.68 |

TABLE 9-continued

Example 3•Lens Data (n and ν at d Line)

| Surface Number | Radius of Curvature | Surface Distance | n | ν |
|---|---|---|---|---|
| 3 | 605.74875 | 0.634 | | |
| 4 | 62.45092 | 5.599 | 1.78800 | 47.37 |
| 5 | 176.97000 | DD[5] | | |
| *6 | 142.52356 | 0.998 | 1.85135 | 40.10 |
| *7 | 12.25326 | 6.856 | | |
| 8 | −37.71493 | 0.840 | 1.88300 | 40.76 |
| 9 | 258.54743 | 0.350 | | |
| 10 | 30.86521 | 3.306 | 1.95906 | 17.47 |
| 11 | −259.24062 | DD[11] | | |
| *12 | −68.64488 | 0.902 | 1.74330 | 49.33 |
| *13 | 42.72399 | DD[13] | | |
| *14 | 16.83750 | 5.883 | 1.62263 | 58.16 |
| *15 | −32.87176 | 0.999 | | |
| 16(Stop) | ∞ | 2.800 | | |
| 17 | 23.70008 | 5.332 | 1.59522 | 67.73 |
| 18 | −15.75531 | 0.984 | 1.92286 | 18.90 |
| 19 | −41.63743 | 2.065 | | |
| 20 | −283.88368 | 2.100 | 1.95906 | 17.47 |
| 21 | −41.77644 | 0.760 | 1.76200 | 40.10 |
| 22 | 21.12874 | 1.998 | | |
| *23 | −397.45950 | 2.186 | 1.58313 | 59.46 |
| *24 | −24.17255 | 2.471 | | |
| 25 | −16.79569 | 1.131 | 1.63930 | 44.87 |

TABLE 9-continued

Example 3·Lens Data (n and ν at d Line)

| Surface Number | Radius of Curvature | Surface Distance | n | ν |
|---|---|---|---|---|
| 26 | −43.94006 | DD[26] | | |
| 27 | −75.37021 | 3.790 | 1.85545 | 36.60 |
| 28 | −30.85920 | 10.740 | | |
| 29 | ∞ | 2.150 | 1.54763 | 54.98 |
| 30 | ∞ | 1.310 | | |
| 31 | ∞ | 0.700 | 1.49784 | 54.98 |
| 32 | ∞ | 1.136 | | |

TABLE 10

Example 3·Specification (d Line)

| | WIDE | MIDDLE | TELE |
|---|---|---|---|
| Zoom Ratio | 1.0 | 2.5 | 4.7 |
| f | 16.502 | 41.011 | 77.774 |

TABLE 10-continued

Example 3·Specification (d Line)

| | WIDE | MIDDLE | TELE |
|---|---|---|---|
| Bf | 15.042 | 15.042 | 15.042 |
| FNo. | 4.10 | 4.10 | 4.04 |
| 2ω[°] | 86.0 | 36.0 | 20.2 |

TABLE 11

Example 3·Variable Surface Distance

| | WIDE | MIDDLE | TELE |
|---|---|---|---|
| DD[5] | 0.377 | 22.589 | 35.918 |
| DD[11] | 10.399 | 4.318 | 4.394 |
| DD[13] | 5.402 | 2.855 | 0.500 |
| DD[26] | 1.000 | 14.561 | 26.643 |

TABLE 12

Example 3·Aspheric Coefficient

| Surface Number | 6 | 7 | 12 | 13 |
|---|---|---|---|---|
| KA | −4.6979493E+00 | 4.2788143E−02 | −4.9710240E+00 | 4.9907493E+00 |
| A3 | 0.0000000E+00 | 0.0000000E+00 | 0.0000000E+00 | 0.0000000E+00 |
| A4 | 7.6064750E−05 | 1.3391504E−04 | −4.1065360E−04 | −4.2327888E−04 |
| A5 | −8.7593788E−06 | −3.8992272E−06 | 2.3445393E−05 | 2.3683883E−05 |
| A6 | 2.0991160E−07 | −3.3100258E−07 | 5.9814555E−06 | 6.5807494E−06 |
| A7 | 3.7888299E−09 | 1.2557411E−08 | −2.6476977E−07 | −3.8875199E−07 |
| A8 | 1.1025562E−09 | 2.4691201E−08 | −6.4410073E−08 | −5.7054286E−08 |
| A9 | −1.0484630E−10 | −3.5609949E−09 | 1.0060353E−09 | −1.3189084E−09 |
| A10 | −9.6846570E−13 | 3.9206552E−11 | −4.4304390E−11 | 3.8978103E−10 |
| A11 | 3.4625600E−13 | 4.2637526E−11 | 4.3357594E−11 | 3.6525693E−11 |
| A12 | 7.7960208E−15 | −5.2867373E−12 | 1.2193627E−12 | 7.1611072E−12 |
| A13 | −2.2479288E−15 | 2.3328759E−13 | 6.7350004E−13 | −3.4395237E−13 |
| A14 | 7.5943702E−17 | −1.7787489E−15 | 6.0660665E−14 | −7.3895840E−14 |
| A15 | 5.2151841E−19 | 3.1908008E−16 | 6.2924297E−15 | −1.5390877E−14 |
| A16 | −1.6110915E−19 | −4.9351280E−18 | −9.3615761E−15 | 1.5759736E−15 |
| A17 | 9.6728920E−21 | 1.4391340E−17 | 5.9376991E−16 | −3.3006897E−17 |
| A18 | −4.7826089E−22 | −3.0289066E−18 | 3.5862958E−17 | 1.3213087E−17 |
| A19 | 6.0007006E−23 | 1.4130318E−19 | 1.0329786E−18 | −2.5194651E−19 |
| A20 | −2.4650259E−24 | 9.4161827E−23 | −3.4156060E−19 | −6.6100457E−20 |

| Surface Number | 14 | 15 | 23 | 24 |
|---|---|---|---|---|
| KA | −6.4690592E−01 | −2.5824448E+00 | −4.9790084E+00 | −4.9985687E+00 |
| A3 | 0.0000000E+00 | 0.0000000E+00 | 0.0000000E+00 | 0.0000000E+00 |
| A4 | 1.1912579E−05 | 2.9989087E−05 | −4.4924634E−05 | −3.7843289E−05 |
| A5 | 2.4243028E−06 | −3.0130672E−06 | −6.7585109E−06 | −8.2534165E−06 |
| A6 | −7.2289754E−07 | 7.7393493E−07 | −1.4819817E−07 | 2.6126962E−06 |
| A7 | 1.4571920E−07 | −7.0807881E−08 | 1.1439703E−07 | −5.4008836E−07 |
| A8 | −3.1319741E−09 | −4.5753743E−09 | −8.9532187E−08 | −1.7932413E−08 |
| A9 | −1.1988187E−09 | 1.7435848E−09 | 6.3953964E−09 | 1.1081769E−08 |
| A10 | −1.1576661E−11 | −3.4373659E−11 | −3.4568536E−10 | −6.3587177E−10 |
| A11 | 1.2044858E−11 | −2.0701220E−11 | 1.5370344E−10 | −2.5442576E−10 |
| A12 | 6.0451698E−13 | 1.7585962E−12 | 1.8188000E−11 | 5.7902007E−11 |
| A13 | −1.9664507E−14 | −4.6384665E−14 | −8.0857974E−12 | −2.3670126E−12 |
| A14 | −2.6728975E−14 | −7.4999688E−15 | −2.2277297E−12 | −4.4296390E−13 |
| A15 | 3.7611701E−15 | 4.6175918E−15 | 2.9797590E−13 | −7.8862771E−14 |
| A16 | −2.1812638E−16 | −5.6267543E−16 | 1.4438387E−14 | 1.9738994E−14 |
| A17 | 1.1566551E−17 | 1.1941218E−17 | 2.7077468E−15 | −1.2745841E−15 |
| A18 | −2.4378050E−18 | 3.0925946E−18 | −4.0774605E−15 | 6.9035185E−16 |
| A19 | 2.2792787E−19 | −4.5107726E−19 | −5.2216894E−16 | −1.3597856E−16 |
| A20 | −4.9068793E−21 | 2.3531059E−20 | 7.9384687E−17 | 7.1661559E−18 |

Figure 4:
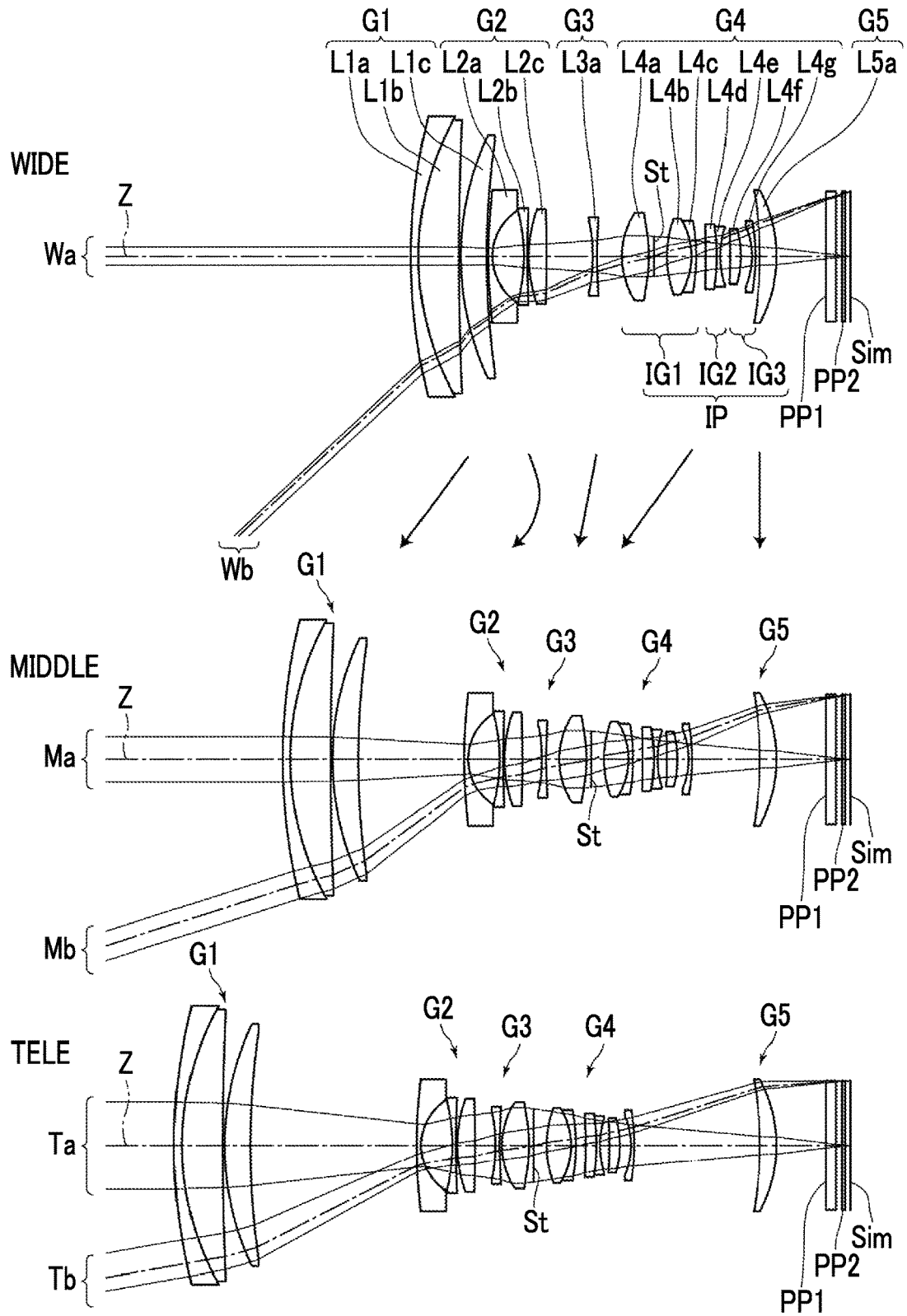
FIG. 4 is a cross-sectional view illustrating a lens configuration of a zoom lens of Example 4 of the present invention.
Figure 9:
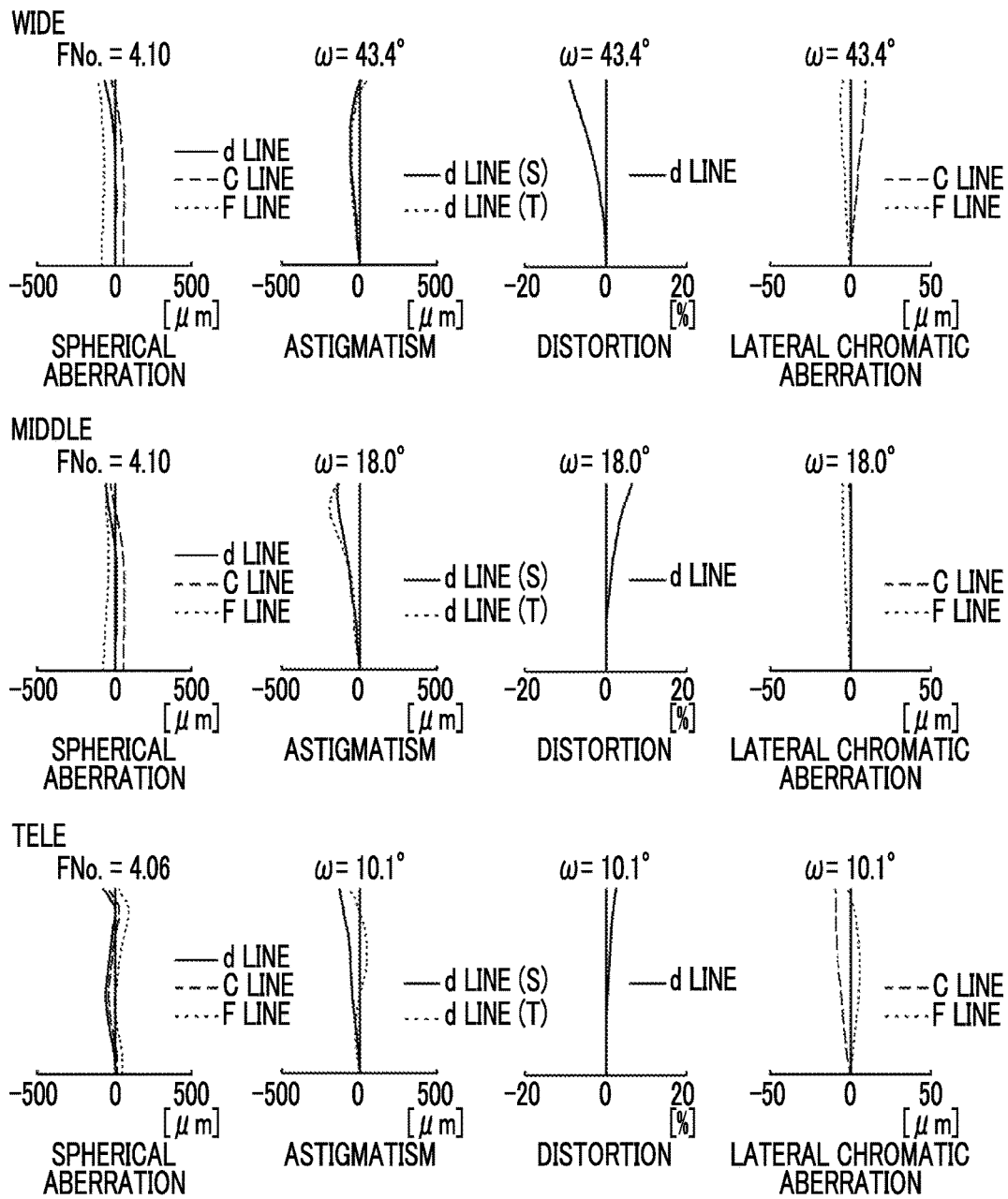
FIG. 9 is a diagram of aberrations of the zoom lens of Example 4 of the present invention.
Figure 20:
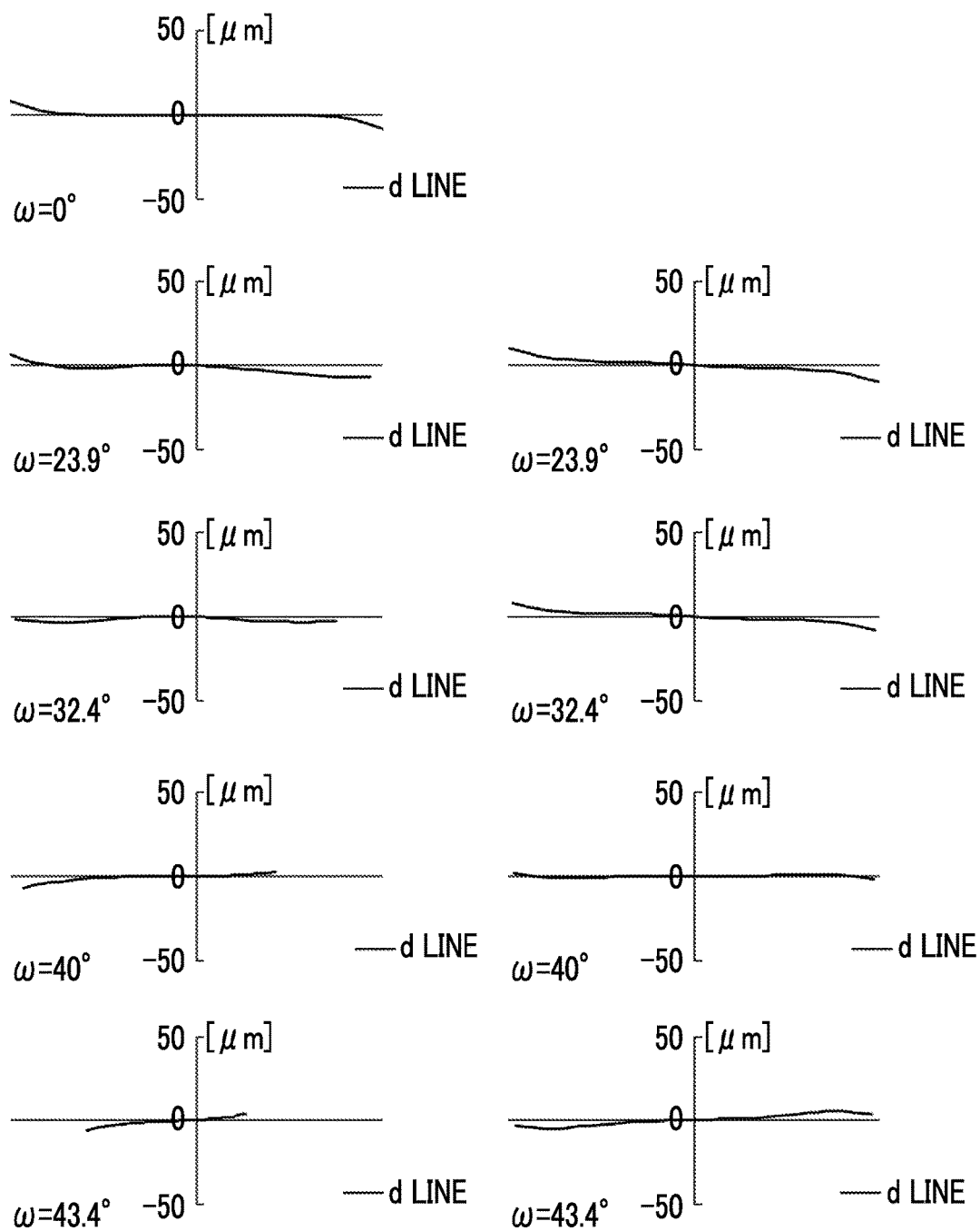
FIG. 20 is a diagram of lateral aberrations of the zoom lens of Example 4 of the present invention at the wide-angle end.
Figure 21:
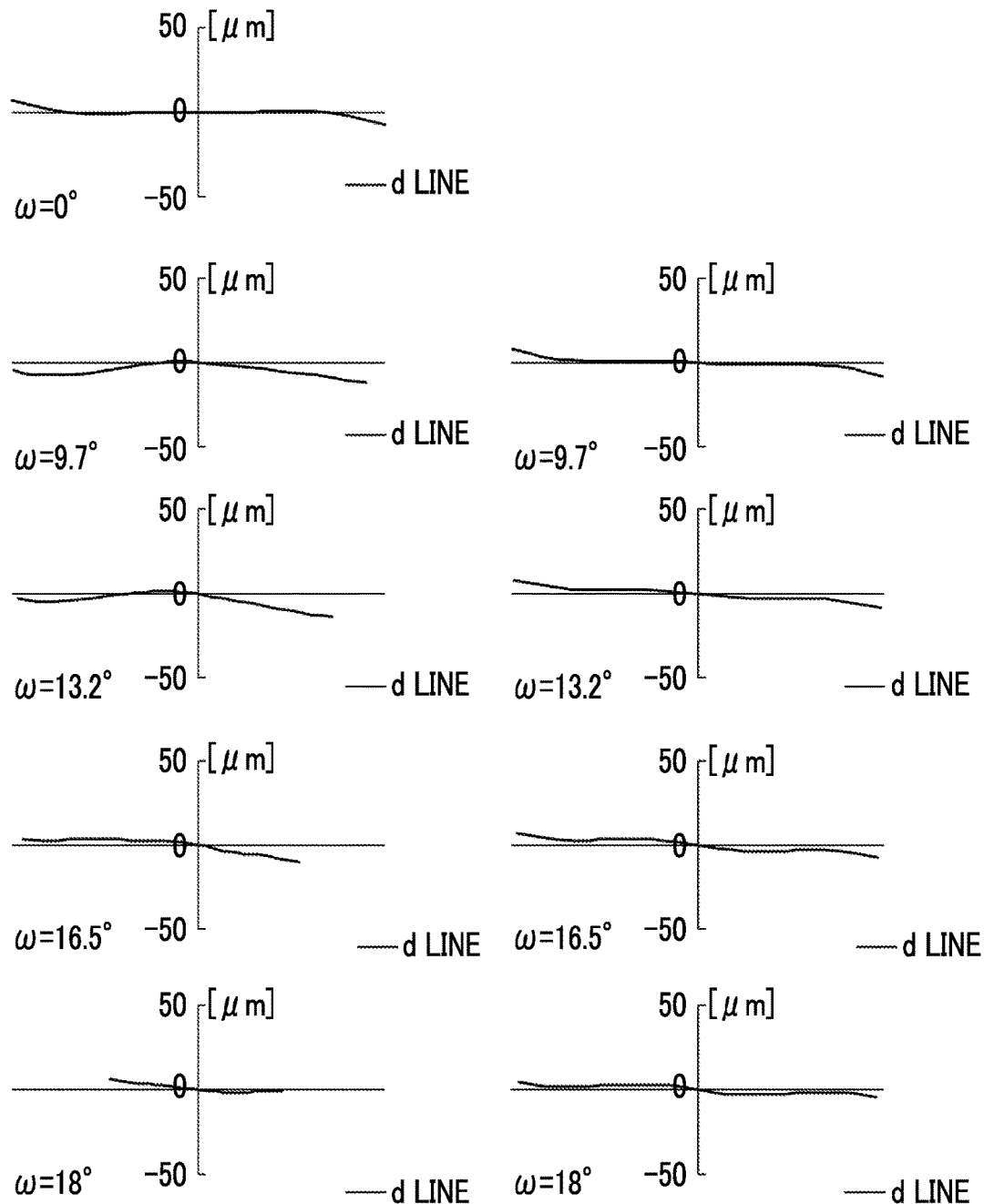
FIG. 21 is a diagram of lateral aberrations of the zoom lens of Example 4 of the present invention at the middle position.
Figure 22:
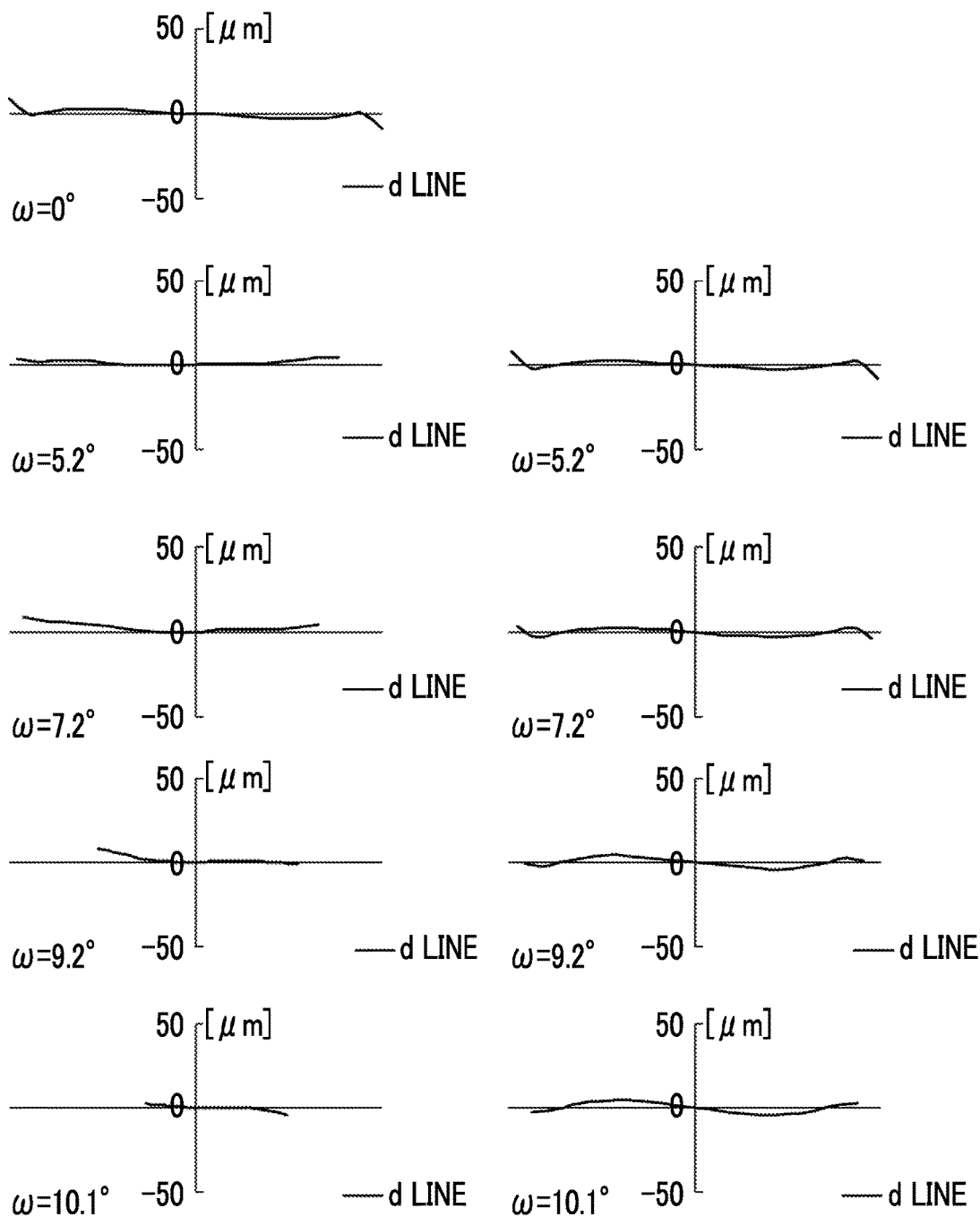
FIG. 22 is a diagram of lateral aberrations of the zoom lens of Example 4 of the present invention at the telephoto end.

Next, a zoom lens of Example 4 will be described. FIG. 4 is a cross-sectional view illustrating a lens configuration of the zoom lens of Example 4. The number of lenses of each group of the zoom lens of Example 4 is the same as that of Example 1. Table 13 shows lens data of the zoom lens of Example 4, Table 14 shows data about specification, Table 15 shows surface distances which are variable during zooming, and Table 16 shows data about aspheric coefficients thereof. FIG. 9 shows a diagram of aberrations, FIG. 20 shows a diagram of lateral aberrations in a case where the object at infinity is in focus at the wide-angle end (WIDE) of the zoom lens, FIG. 21 shows a diagram of lateral aberrations in a case where the object at infinity is in focus at the middle position (MIDDLE) thereof, and FIG. 22 shows a diagram of lateral aberrations in a case where the object at infinity is in focus at the telephoto end (TELE) thereof.

TABLE 13

Example 4•Lens Data (n and ν at d Line)

| Surface Number | Radius of Curvature | Surface Distance | n | ν |
|---|---|---|---|---|
| 1 | 127.65215 | 1.625 | 1.85896 | 22.73 |
| 2 | 62.93823 | 8.727 | 1.72916 | 54.68 |
| 3 | 663.41139 | 0.406 | | |
| 4 | 62.65500 | 5.582 | 1.78800 | 47.37 |
| 5 | 177.43645 | DD[5] | | |
| *6 | 174.49703 | 0.880 | 1.85135 | 40.10 |
| *7 | 12.26380 | 6.793 | | |
| 8 | −38.52917 | 0.780 | 1.88300 | 40.76 |
| 9 | 272.12189 | 0.271 | | |
| 10 | 30.32679 | 3.855 | 1.95906 | 17.47 |
| 11 | −291.32578 | DD[11] | | |
| *12 | −73.19399 | 0.909 | 1.74330 | 49.33 |
| *13 | 41.42909 | DD[13] | | |
| *14 | 16.95382 | 5.891 | 1.62263 | 58.16 |
| *15 | −32.14735 | 0.997 | | |
| 16(Stop) | ∞ | 2.800 | | |
| 17 | 23.99578 | 5.284 | 1.59522 | 67.73 |
| 18 | −15.88431 | 1.031 | 1.92286 | 18.90 |
| 19 | −41.43676 | 2.061 | | |

TABLE 13-continued

Example 4•Lens Data (n and ν at d Line)

| Surface Number | Radius of Curvature | Surface Distance | n | ν |
|---|---|---|---|---|
| 20 | −270.82021 | 2.394 | 1.95906 | 17.47 |
| 21 | −41.48242 | 0.760 | 1.76200 | 40.10 |
| 22 | 21.03523 | 1.998 | | |
| *23 | −420.06426 | 2.272 | 1.58313 | 59.46 |
| *24 | −24.36365 | 2.423 | | |
| 25 | −16.87761 | 0.750 | 1.63930 | 44.87 |
| 26 | −45.50435 | DD[26] | | |
| *27 | −77.81568 | 3.656 | 1.85545 | 36.60 |
| 28 | −30.73888 | 10.740 | | |
| 29 | ∞ | 2.150 | 1.54763 | 54.98 |
| 30 | ∞ | 1.310 | | |
| 31 | ∞ | 0.700 | 1.49784 | 54.98 |
| 32 | ∞ | 1.137 | | |

TABLE 14

Example 4•Specification (d Line)

| | WIDE | MIDDLE | TELE |
|---|---|---|---|
| Zoom Ratio | 1.0 | 2.5 | 4.7 |
| f′ | 16.502 | 41.011 | 77.774 |
| Bf | 15.043 | 15.043 | 15.043 |
| FNo. | 4.10 | 4.10 | 4.06 |
| 2ω[°] | 86.8 | 36.0 | 20.2 |

TABLE 15

Example 4•Variable Surface Distance

| | WIDE | MIDDLE | TELE |
|---|---|---|---|
| DD[5] | 0.375 | 22.820 | 35.967 |
| DD[11] | 9.972 | 4.197 | 4.379 |
| DD[13] | 5.397 | 2.860 | 0.500 |
| DD[26] | 1.053 | 14.603 | 26.996 |

TABLE 16

Example 4•Aspheric Coefficient

| Surface Number | 6 | 7 | 12 | 13 |
|---|---|---|---|---|
| KA | −4.9807145E+00 | 4.4290822E−02 | −4.4583013E+00 | 4.9201896E+00 |
| A3 | 0.0000000E+00 | 0.0000000E+00 | 0.0000000E+00 | 0.0000000E+00 |
| A4 | 7.6164035E−05 | 1.3286098E−04 | −4.1120863E−04 | −4.2672794E−04 |
| A5 | −8.7721018E−06 | −3.7702682E−06 | 2.3490180E−05 | 2.3967381E−05 |
| A6 | 2.0956878E−07 | −3.2625608E−07 | 6.0250518E−06 | 6.6018556E−06 |
| A7 | 3.7781111E−09 | 1.1780675E−08 | −2.6096197E−07 | −3.9359259E−07 |
| A8 | 1.0980496E−09 | 2.4647301E−08 | −6.7022870E−08 | −5.6549881E−08 |
| A9 | −1.0511846E−10 | −3.5638524E−09 | 1.1956612E−09 | −1.3389103E−09 |
| A10 | −9.5854967E−13 | 3.8965896E−11 | −1.1148198E−11 | 4.0512087E−10 |
| A11 | 3.4663362E−13 | 4.2637223E−11 | 4.5884904E−11 | 3.7458865E−11 |
| A12 | 7.8212317E−15 | −5.2891911E−12 | −1.0410964E−12 | 5.6496430E−12 |
| A13 | −2.2507751E−15 | 2.3331205E−13 | 8.1534329E−13 | −2.4004981E−13 |
| A14 | 7.6345452E−17 | −1.7915014E−15 | 8.0577502E−14 | −6.1787291E−14 |
| A15 | 5.4615288E−19 | 3.1815047E−16 | 5.6695794E−15 | −1.4597836E−14 |
| A16 | −1.5977448E−19 | −4.9903380E−18 | −9.7788293E−15 | 1.2097149E−15 |
| A17 | 9.7239702E−21 | 1.4364516E−17 | 6.0668482E−16 | −1.6001319E−17 |
| A18 | −4.7713072E−22 | −3.0340986E−18 | 3.9480484E−17 | 1.1904580E−17 |
| A19 | 5.9661280E−23 | 1.4209151E−19 | 1.1673167E−18 | 1.2466559E−19 |
| A20 | −2.5066115E−24 | 1.2214035E−22 | −3.7561139E−19 | −8.9349546E−20 |

TABLE 16-continued

Example 4•Aspheric Coefficient

| Surface Number | 14 | 15 | 23 | 24 |
|---|---|---|---|---|
| KA | −6.6489308E−01 | −2.3646955E+00 | 4.3050573E+00 | −4.8340114E+00 |
| A3 | 0.0000000E+00 | 0.0000000E+00 | 0.0000000E+00 | 0.0000000E+00 |
| A4 | 9.3860044E−06 | 2.8525632E−05 | −4.7103879E−05 | −3.7106354E−05 |
| A5 | 2.3606663E−06 | −3.1522393E−06 | −6.2174344E−06 | −7.8801678E−06 |
| A6 | −7.1240465E−07 | 7.8925168E−07 | −3.4667231E−07 | 2.5052217E−06 |
| A7 | 1.4564986E−07 | −7.1435556E−08 | 1.3981090E−07 | −5.3636374E−07 |
| A8 | −2.4984537E−09 | −4.9129808E−09 | −8.7718593E−08 | −1.7367837E−08 |
| A9 | −1.4385123E−09 | 1.7136681E−09 | 5.9432616E−09 | 1.1159720E−08 |
| A10 | −3.9491818E−13 | −3.5399290E−11 | −3.6033632E−10 | −6.2018411E−10 |
| A11 | 1.3327581E−11 | −1.9649072E−11 | 1.5055756E−10 | −2.5276096E−10 |
| A12 | 6.2758723E−13 | 1.8239007E−12 | 1.2009641E−11 | 5.6235357E−11 |
| A13 | −5.3038388E−14 | −8.1766216E−14 | −7.3480761E−12 | −2.2970468E−12 |
| A14 | −2.5013432E−14 | −5.5017106E−15 | −2.0069955E−12 | −4.3505019E−13 |
| A15 | 3.9212783E−15 | 4.8394793E−15 | 3.0628984E−13 | −7.7951201E−14 |
| A16 | −2.0702163E−16 | −5.6612542E−16 | 2.2486690E−14 | 1.9733451E−14 |
| A17 | 1.2430851E−17 | 9.6361364E−18 | 2.3832367E−14 | −1.2274615E−15 |
| A18 | −3.1605364E−18 | 3.2396177E−18 | −4.1363022E−15 | 6.8160896E−16 |
| A19 | 2.4592521E−19 | −5.0273649E−19 | −4.9765125E−16 | −1.3535652E−16 |
| A20 | −2.8220143E−21 | 2.7443141E−20 | 8.1731203E−17 | 7.0997217E−18 |

| Surface Number | 27 |
|---|---|
| KA | 8.8986050E−01 |
| A4 | 6.0288683E−07 |
| A6 | −9.2994823E−10 |
| A8 | −4.8402485E−12 |
| A10 | 1.3117909E−14 |

Next, a zoom lens of Example 5 will be described. FIG. 5 is a cross-sectional view illustrating a lens configuration of the zoom lens of Example 5. The zoom lens of Example 5 consists of six lens groups as a whole. The first lens group G1 is composed of three lenses L1a to L1c, the second lens group G2 is composed of three lenses L2a to L2c, the third lens group G3 is composed of only one lens L3a, the fourth lens group G4 is composed of six lenses L4a to L4f, the fifth lens group G5 is composed of only one lens L5a, and the sixth lens group G6 is composed of only one lens Lha. The fourth lens group G4 and the fifth lens group G5 correspond to the intermediate part IP, and the sixth lens group G6 corresponds to the final lens group. In addition, it is assumed that the intermediate part IP consists of, in order from the object side, a first positive intermediate part lens group IG1, a second negative intermediate part lens group IG2, and a third positive intermediate part lens group IG3. However, in this case, a part ranging from the first positive intermediate part lens group IG1 to the middle of the third positive intermediate part lens group IG3 corresponds to the fourth lens group G4, and the remaining part of the third positive intermediate part lens group IG3 corresponds to the fifth lens group G5.

Figure 10:
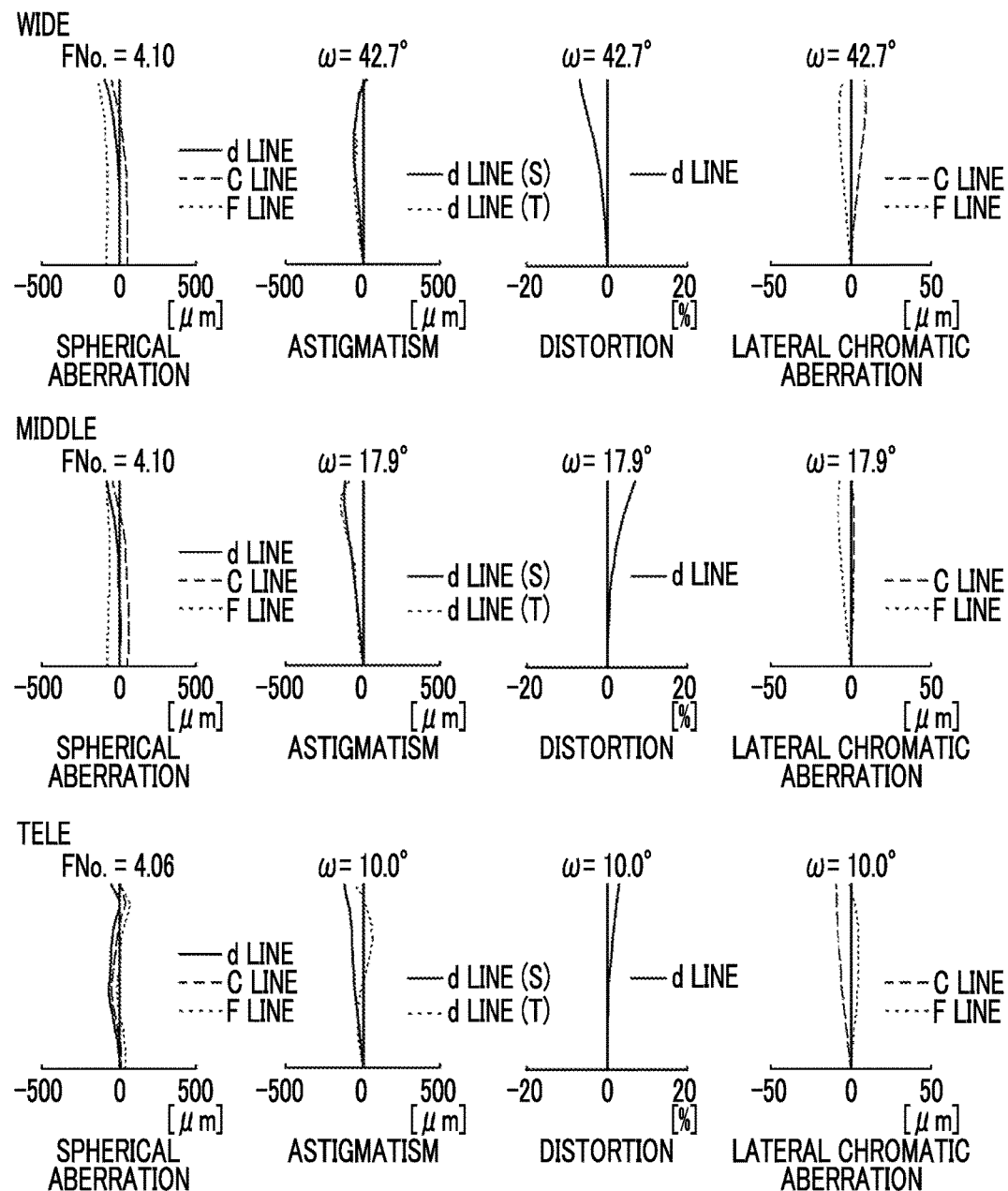
FIG. 10 is a diagram of aberrations of the zoom lens of Example 5 of the present invention.
Figure 23:
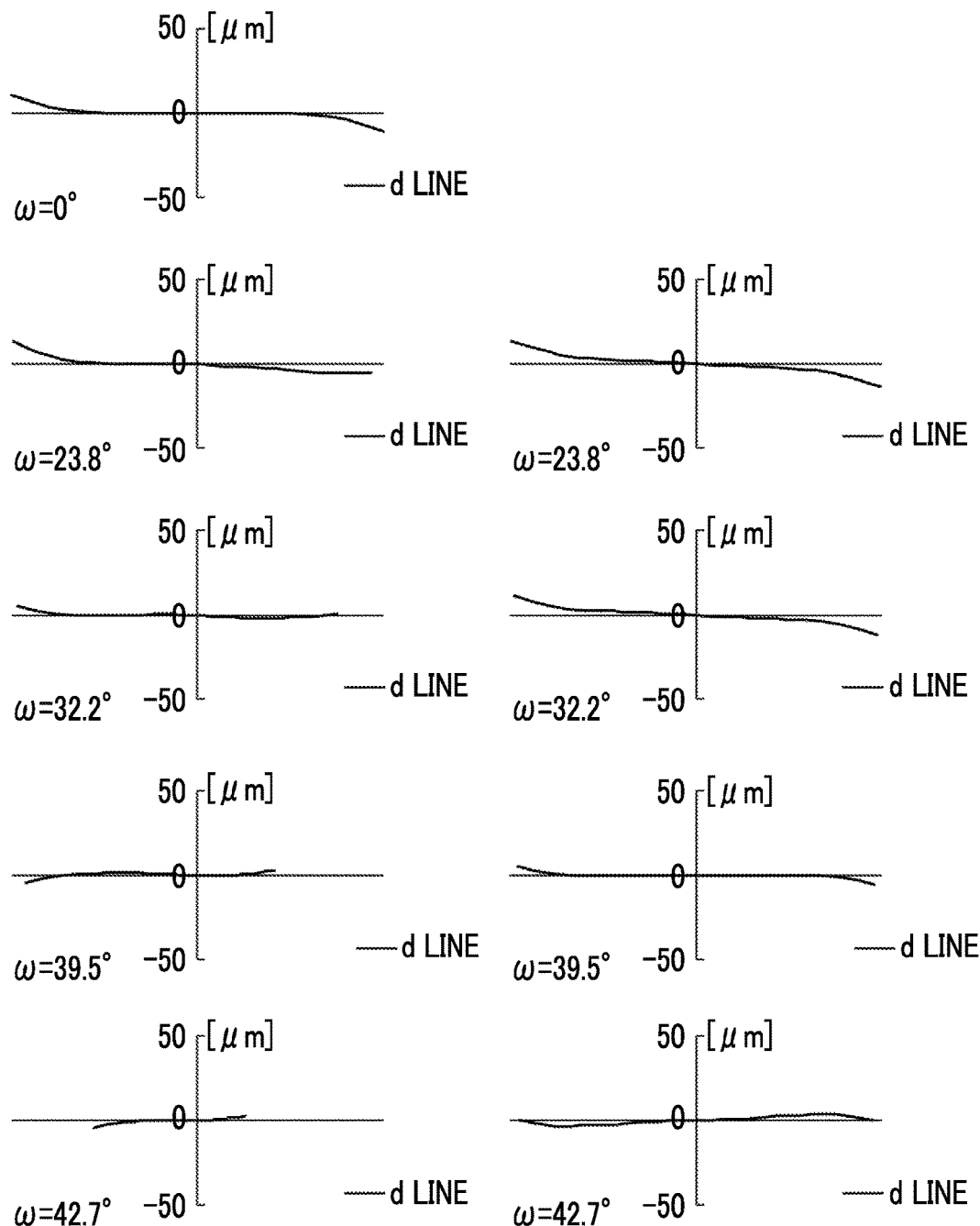
FIG. 23 is a diagram of lateral aberrations of the zoom lens of Example 5 of the present invention at the wide-angle end.
Figure 24:
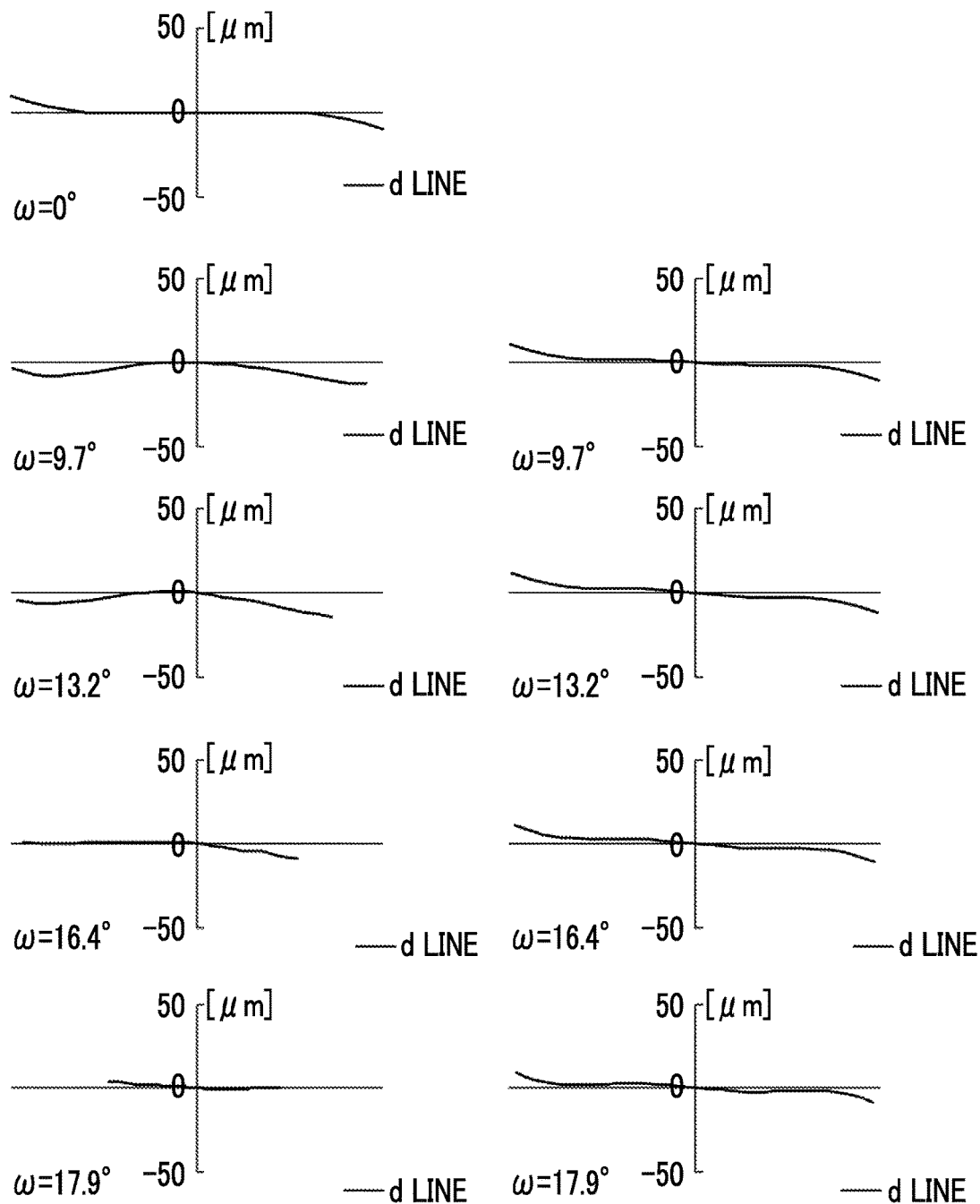
FIG. 24 is a diagram of lateral aberrations of the zoom lens of Example 5 of the present invention at the middle position.
Figure 25:
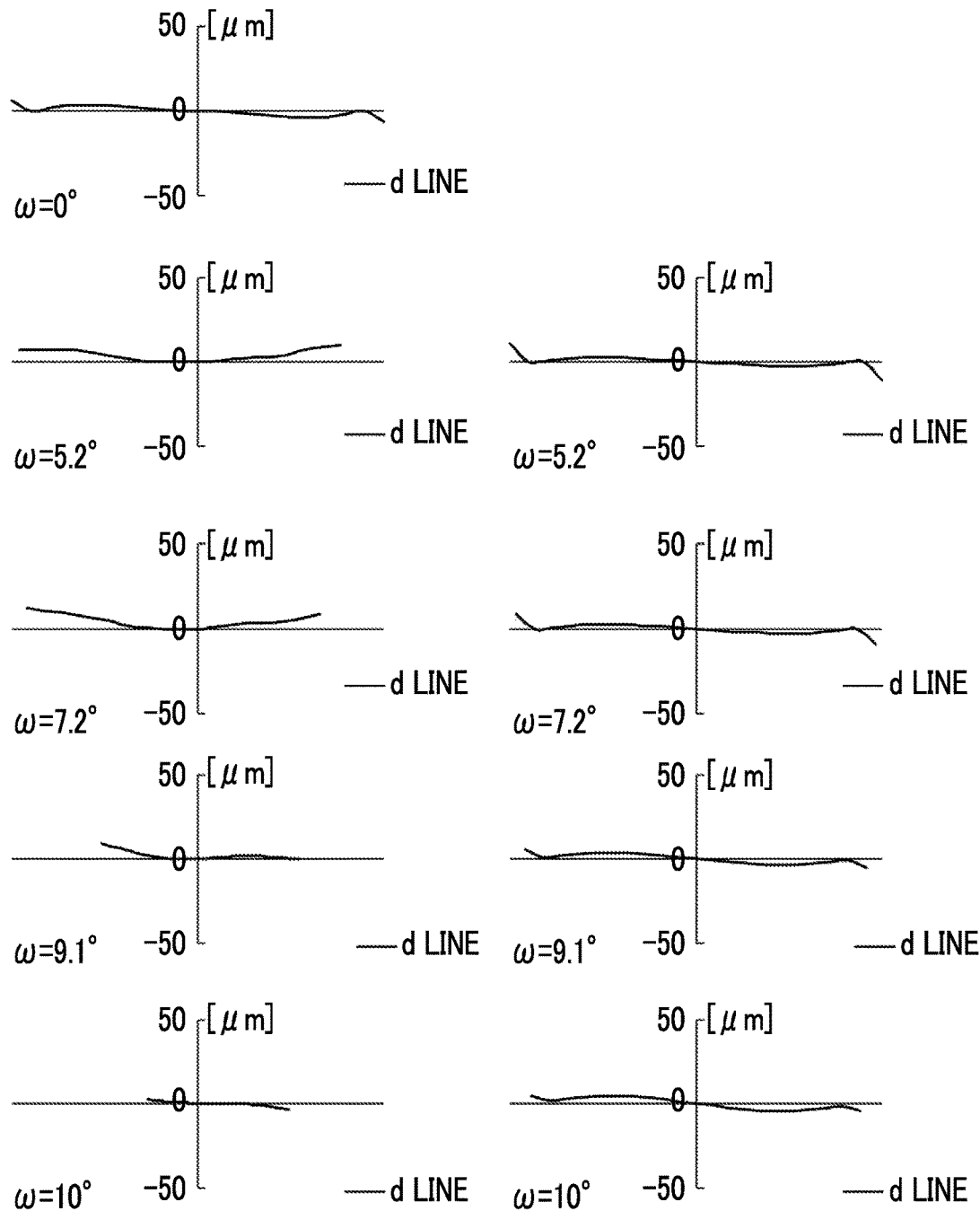
FIG. 25 is a diagram of lateral aberrations of the zoom lens of Example 5 of the present invention at the telephoto end.

Table 17 shows lens data of the zoom lens of Example 5, Table 18 shows data about specification, Table 19 shows surface distances which are variable during zooming, and Table 20 shows data about aspheric coefficients thereof. FIG. 10 shows a diagram of aberrations, FIG. 23 shows a diagram of lateral aberrations in a case where the object at infinity is in focus at the wide-angle end (WIDE) of the zoom lens, FIG. 24 shows a diagram of lateral aberrations in a case where the object at infinity is in focus at the middle position (MIDDLE) thereof, and FIG. 25 shows a diagram of lateral aberrations in a case where the object at infinity is in focus at the telephoto end (TELE) thereof.

TABLE 17

Example 5•Lens Data (n and ν at d Line)

| Surface Number | Radius of Curvature | Surface Distance | n | ν |
|---|---|---|---|---|
| 1 | 125.84028 | 2.218 | 1.85896 | 22.73 |
| 2 | 63.33073 | 8.802 | 1.72916 | 54.68 |
| 3 | 565.15955 | 0.696 | | |
| 4 | 62.33278 | 5.726 | 1.78800 | 47.37 |
| 5 | 176.18104 | DD[5] | | |
| *6 | 147.78713 | 1.156 | 1.85135 | 40.10 |
| *7 | 12.23006 | 6.861 | | |
| 8 | −37.62172 | 0.994 | 1.88300 | 40.76 |
| 9 | 252.02377 | 0.433 | | |
| 10 | 31.23952 | 3.235 | 1.95906 | 17.47 |
| 11 | −247.79672 | DD[11] | | |
| *12 | −69.22427 | 0.897 | 1.74330 | 49.33 |
| *13 | 42.79348 | DD[13] | | |
| *14 | 16.78835 | 6.024 | 1.62263 | 58.16 |
| *15 | −32.91411 | 1.000 | | |
| 16(Stop) | ∞ | 2.800 | | |
| 17 | 23.60710 | 5.324 | 1.59522 | 67.73 |
| 18 | −15.83007 | 1.219 | 1.92286 | 18.90 |
| 19 | −41.35888 | 2.064 | | |
| 20 | −275.40556 | 2.335 | 1.95906 | 17.47 |
| 21 | −41.58785 | 0.760 | 1.76200 | 40.10 |
| 22 | 21.04996 | 1.998 | | |
| *23 | −442.79077 | 2.501 | 1.58313 | 59.46 |
| *24 | −24.12246 | DD[24] | | |
| 25 | −16.83116 | 0.807 | 1.63930 | 44.87 |
| 26 | −43.52990 | DD[26] | | |
| 27 | −72.69367 | 3.794 | 1.85545 | 36.60 |
| 28 | −30.99803 | 12.058 | | |
| 29 | ∞ | 2.150 | 1.54763 | 54.98 |
| 30 | ∞ | 1.310 | | |
| 31 | ∞ | 0.700 | 1.49784 | 54.98 |
| 32 | ∞ | 1.139 | | |

TABLE 18

Example 5·Specification (d Line)

| | WIDE | MIDDLE | TELE |
|---|---|---|---|
| Zoom Ratio | 1.0 | 2.5 | 4.7 |
| f | 16.499 | 41.003 | 77.758 |
| Bf | 16.363 | 16.363 | 16.363 |
| FNo. | 4.10 | 4.10 | 4.06 |
| 2ω[°] | 85.4 | 35.8 | 20.0 |

TABLE 19

Example 5·Variable Surface Distance

| | WIDE | MIDDLE | TELE |
|---|---|---|---|
| DD[5] | 0.375 | 22.536 | 35.791 |
| DD[11] | 10.276 | 4.085 | 4.465 |
| DD[13] | 5.426 | 2.918 | 0.506 |
| DD[24] | 0.822 | 0.690 | 0.600 |
| DD[26] | 1.315 | 15.678 | 28.805 |

TABLE 20

Example 5·Aspheric Coefficient

| Surface Number | 6 | 7 | 12 | 13 |
|---|---|---|---|---|
| KA | −4.7407355E+00 | 4.2478293E−02 | −4.8892222E+00 | 4.9796053E+00 |
| A3 | 0.0000000E+00 | 0.0000000E+00 | 0.0000000E+00 | 0.0000000E+00 |
| A4 | 7.6063356E−05 | 1.3388766E−04 | −4.1094288E−04 | −4.2345418E−04 |
| A5 | −8.7574601E−06 | −3.9352370E−06 | 2.3416258E−05 | 2.3630000E−05 |
| A6 | 2.1008206E−07 | −3.3557227E−07 | 5.9768415E−06 | 6.5683837E−06 |
| A7 | 3.7947164E−09 | 1.1844350E−08 | −2.6637092E−07 | −3.8911575E−07 |
| A8 | 1.1037648E−09 | 2.4656160E−08 | −6.3757233E−08 | −5.6431719E−08 |
| A9 | −1.0470101E−10 | −3.5629587E−09 | 9.6215681E−10 | −1.3488382E−09 |
| A10 | −9.6524991E−13 | 3.9174511E−11 | −5.2338963E−11 | 3.8293302E−10 |
| A11 | 3.4635859E−13 | 4.2644816E−11 | 4.3497557E−11 | 3.6111599E−11 |
| A12 | 7.7956430E−15 | −5.2833600E−12 | 1.4934795E−12 | 7.3994285E−12 |
| A13 | −2.2479307E−15 | 2.3350085E−13 | 6.5191455E−13 | −3.5663479E−13 |
| A14 | 7.5946177E−17 | −1.7567272E−15 | 5.8584181E−14 | −7.4169445E−14 |
| A15 | 5.2271073E−19 | 3.2084888E−16 | 6.0910093E−15 | −1.5279830E−14 |
| A16 | −1.6095205E−19 | −4.7846917E−18 | −9.2813420E−15 | 1.5616580E−15 |
| A17 | 9.6860920E−21 | 1.4394862E−17 | 5.9430355E−16 | −3.5575762E−17 |
| A18 | −4.7758223E−22 | −3.0285594E−18 | 3.5215147E−17 | 1.3659792E−17 |
| A19 | 5.9928514E−23 | 1.4127610E−19 | 1.0205890E−18 | −2.8631839E−19 |
| A20 | −2.4788905E−24 | 9.7949097E−23 | −3.3806082E−19 | −6.3836667E−20 |

| Surface Number | 14 | 15 | 23 | 24 |
|---|---|---|---|---|
| KA | −6.4766979E−01 | −2.5679056E+00 | 4.9571827E+00 | −4.9978175E+00 |
| A3 | 0.0000000E+00 | 0.0000000E+00 | 0.0000000E+00 | 0.0000000E+00 |
| A4 | 1.2717961E−05 | 2.8773753E−05 | −4.7699000E−05 | −3.6242662E−05 |
| A5 | 2.4082403E−06 | −2.9983767E−06 | −6.8705676E−06 | −8.1085871E−06 |
| A6 | −7.2780838E−07 | 7.7349992E−07 | −1.9480638E−07 | 2.6291956E−06 |
| A7 | 1.4482219E−07 | −7.1347864E−08 | 1.1125002E−07 | −5.4025555E−07 |
| A8 | −3.3322622E−09 | −4.4643707E−09 | −8.9594651E−08 | −1.8088683E−08 |
| A9 | −1.1498503E−09 | 1.7315190E−09 | 6.2081329E−09 | 1.0978712E−08 |
| A10 | −1.3421110E−11 | −3.6710191E−11 | −3.3612729E−10 | −6.3480583E−10 |
| A11 | 1.1874388E−11 | −2.0827748E−11 | 1.5288657E−10 | −2.5427471E−10 |
| A12 | 6.3335113E−13 | 1.7731674E−12 | 1.8326919E−11 | 5.8081104E−11 |
| A13 | −1.5349191E−14 | −3.2158046E−14 | −8.1003856E−12 | −2.3378928E−12 |
| A14 | −2.7087970E−14 | −7.9320914E−15 | −2.2338393E−12 | −4.3865166E−13 |
| A15 | 3.7256183E−15 | 4.5986332E−15 | 3.0252193E−13 | −7.8030351E−14 |
| A16 | −2.2042437E−16 | −5.6286412E−16 | 1.4024912E−14 | 1.9882625E−14 |
| A17 | 1.1530944E−17 | 1.0558940E−17 | 2.7078402E−14 | −1.2678032E−15 |
| A18 | −2.3585493E−18 | 3.1025846E−18 | −4.0615262E−15 | 6.8949222E−16 |
| A19 | 2.2512974E−19 | −4.4775535E−19 | −5.2289418E−16 | −1.3621247E−16 |
| A20 | −5.0431697E−21 | 2.4009490E−20 | 7.9068623E−17 | 7.0692026E−18 |

Table 21 shows values corresponding to Conditional Expressions (1) to (6) of the zoom lenses of Examples 1 to 5. It should be noted that, in the above-mentioned examples, the d line is set as the reference wavelength, and the values shown in the following Table 21 are values at the reference wavelength.

TABLE 21

| Expression Number | Conditional Expression | Example 1 | Example 2 | Example 3 | Example 4 | Example 5 |
|---|---|---|---|---|---|---|
| (1) | f1/(−f2) | 4.53 | 4.37 | 4.17 | 4.18 | 4.21 |
| (2) | f3/f2 | 2.31 | 2.21 | 1.72 | 1.73 | 1.73 |

TABLE 21-continued

| Expression Number | Conditional Expression | Example 1 | Example 2 | Example 3 | Example 4 | Example 5 |
|---|---|---|---|---|---|---|
| (3) | TTLw/Bfw | 6.46 | 6.48 | 6.36 | 6.32 | 5.88 |
| (4) | fw/f1 | 0.20 | 0.20 | 0.19 | 0.19 | 0.19 |
| (5) | Fw/(−f2) | 0.88 | 0.87 | 0.81 | 0.81 | 0.81 |
| (6) | L23/fw | 0.62 | 0.61 | 0.63 | 0.60 | 0.62 |

As can be seen from the above-mentioned data, all the zoom lenses of Example 1 to 5 satisfy Conditional Expressions (1) to (6), and are zoom lenses each of which has a high magnification of 4 or more times and has a short total length.

Figure 26:
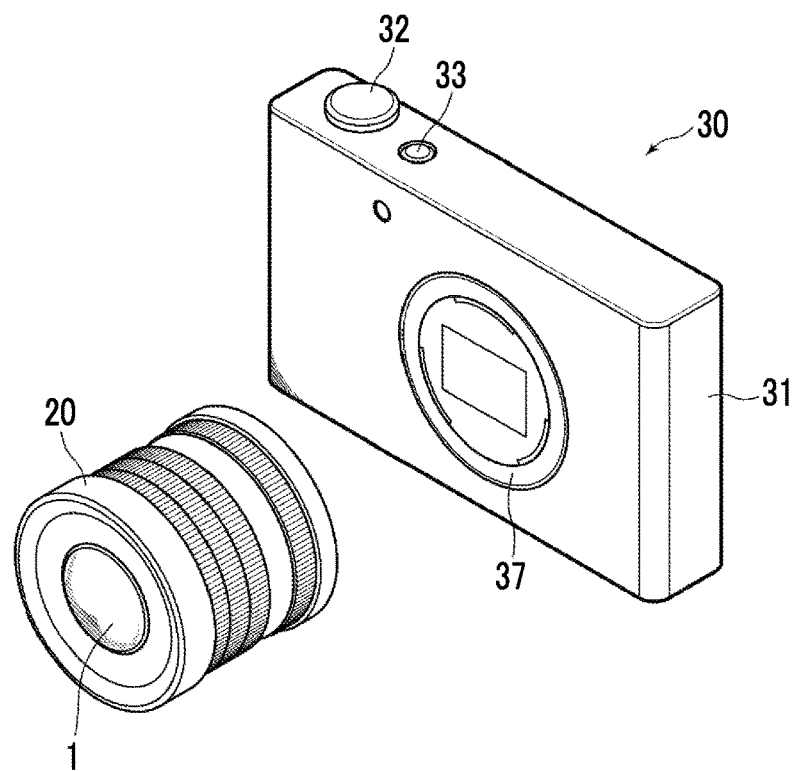
FIG. 26 is a perspective view illustrating the front side of an imaging apparatus according to an embodiment of the present invention.
Figure 27:
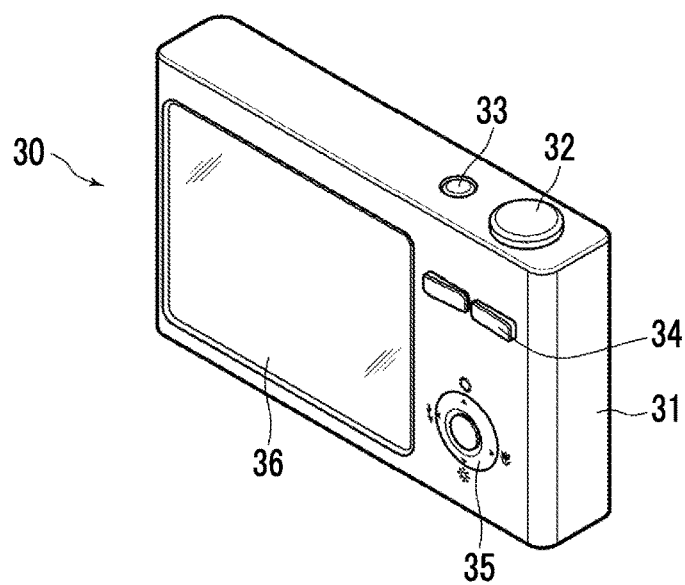
FIG. 27 is a perspective view illustrating the rear side of the imaging apparatus of FIG. 26.

Next, an embodiment of the imaging apparatus according to the present invention will be described with reference to FIGS. 26 and 27. In FIGS. 26 and 27, a camera 30, which is obliquely viewed respectively on the front side and the rear side, is a non-reflex (so-called mirrorless) type digital camera on which an interchangeable lens 20 housing the zoom lens 1 according to the embodiment of the present invention in a lens barrel is detachably mounted.

The camera 30 comprises a camera body 31, and a shutter button 32 and a power button 33 are provided on an upper surface thereof. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element (not shown in the drawing), a signal processing circuit, a recording medium, and the like. The imaging element such as a charge coupled device (CCD) receives a subject image which is formed through the interchangeable lens 20, and outputs a captured image signal based on the subject image. The signal processing circuit generates an image through processing of the captured image signal which is output from the imaging element. The recording medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the examples, and different values may be used therefor.

In the embodiment of the imaging apparatus, the non-reflex type digital camera is taken as an example and described with the drawings. However, the imaging apparatus of the present invention is not limited to this. For example, the present invention may be applied to imaging apparatuses such as video cameras, digital cameras which are not the non-reflex type, movie imaging cameras, broadcast cameras.

EXPLANATION OF REFERENCES

1: zoom lens
20: interchangeable lens
30: camera
31: camera body
32: shutter button
33: power button
34, 35: operation section
36: display section
37: mount
G1: first lens group
G2: second lens group
G3: third lens group
G4: fourth lens group
G5: fifth lens group
G6: sixth lens group
IP: intermediate part
IG1: first positive intermediate part lens group
IG2: second negative intermediate part lens group
IG3: third positive intermediate part lens group
L1a to Lha: lens
Ma: on-axis rays at middle position
Mb: rays with the maximum angle of view at middle position
PP1, PP2: optical member
Sim: image plane
St: aperture stop
Ta: on-axis rays at telephoto end
Tb: rays with the maximum angle of view at telephoto end
Wa: on-axis rays at wide-angle end
Wb: rays with the maximum angle of view at wide-angle end
Z: optical axis

What is claimed is:
1. A zoom lens consisting of, in order from an object side:
a first lens group that has a positive refractive power;
a second lens group that has a negative refractive power;
a third lens group that has a negative refractive power;
an intermediate part that consists of one lens group or a plurality of lens groups; and
a final lens group that has a positive refractive power,
wherein the first lens group consists of three lenses, and has a cemented lens which is formed by cementing at least one positive lens and at least one negative lens,
wherein the second lens group consists of, in order from the object side, a negative meniscus lens, a biconcave lens, and a biconvex lens,
wherein the third lens group consists of one lens,
wherein the final lens group has a lens, which is convex toward an image side, at a position closest to the image side,
wherein during zooming from a wide-angle end to a telephoto end, a distance between the first lens group and the second lens group constantly increases, a distance between the second lens group and the third lens group changes, a distance between the third lens group and the intermediate part constantly decreases, and a distance between the intermediate part and the final lens group constantly increases, wherein during focusing, only the third lens group moves in a direction of an optical axis, and wherein assuming that a focal length of the first lens group is f1 and a focal length of the second lens group is f2, Conditional Expression (1) is satisfied:

$$3.5<f1/(-f2)<5.5 \quad (1).$$

2. The zoom lens according to claim 1,
wherein assuming that a focal length of the third lens group is f3, Conditional Expression (2) is satisfied:

$$1<f3/f2<3 \quad (2).$$

3. The zoom lens according to claim 1,
wherein assuming that a total lens length at the wide-angle end is TTLw and a back focal length at the wide-angle end is Bfw, Conditional Expression (3) is satisfied:

$$4<TTLw/Bfw<7 \quad (3).$$

4. The zoom lens according to claim 1,
wherein assuming that a focal length of the whole system during focusing on an object at infinity at the wide-angle end is fw and a focal length of the first lens group is f1, Conditional Expression (4) is satisfied:

$$0.18<fw/f1<0.3 \quad (4).$$

5. The zoom lens according to claim 1,
wherein assuming that a focal length of the whole system during focusing on an object at infinity at the wide-angle end is fw, Conditional Expression (5) is satisfied:

$$0.5<fw/(-f2)<1 \quad (5).$$

6. The zoom lens according to claim 1,
wherein assuming that a distance on an optical axis between the second lens group and the third lens group at the wide-angle end is L23 and a focal length of the whole system during focusing on an object at infinity at the wide-angle end is fw, Conditional Expression (6) is satisfied:

$$0.4<L23/fw<1 \quad (6).$$

7. The zoom lens according to claim 1,
wherein the intermediate part has a positive refractive power as a whole, and consists of, in order from the object side, a first positive intermediate part lens group that has a positive refractive power, a second negative intermediate part lens group that has a negative refractive power, and a third positive intermediate part lens group that has a positive refractive power, wherein during a vibration-proof operation, only the second negative intermediate part lens group moves in a direction perpendicular to the optical axis.

8. The zoom lens according to claim 1,
wherein the intermediate part has a positive refractive power as a whole, and consists of, in order from the object side, a biconvex lens, a cemented lens that consists of a biconvex lens and a negative meniscus lens, a cemented lens that consists of a positive meniscus lens and a biconcave lens, a positive lens, and a negative meniscus lens, wherein during a vibration-proof operation, only some lenses of the intermediate part move in a direction perpendicular to the optical axis.

9. The zoom lens according to claim 8,
wherein the cemented lens, which consists of the positive meniscus lens and the biconcave lens, has a negative refractive power as a whole, and wherein during a vibration-proof operation, only the cemented lens, which consists of the positive meniscus lens and the biconcave lens, moves in the direction perpendicular to the optical axis.

10. The zoom lens according to claim 1,
wherein the intermediate part consists of only a fourth lens group which is one lens group.

11. The zoom lens according to claim 1,
wherein the intermediate part consists of, in order from the object side, a fourth lens group and a fifth lens group by which a distance between the fifth lens group and the fourth lens group changes during zooming.

12. The zoom lens according to claim 1,
wherein the first lens group has a negative meniscus lens, which is concave toward the image side, at a position closest to the object side.

13. The zoom lens according to claim 1,
wherein the final lens group consists of one lens.

14. The zoom lens according to claim 1,
wherein Conditional Expression (1-1) is satisfied:

$$4<f1/(-f2)<5 \quad (1\text{-}1).$$

15. The zoom lens according to claim 2,
wherein Conditional Expression (2-1) is satisfied:

$$1.5<f3/f2<2.5 \quad (2\text{-}1).$$

16. The zoom lens according to claim 3,
wherein Conditional Expression (3-1) is satisfied:

$$5<TTLw/Bfw<6.5 \quad (3\text{-}1).$$

17. The zoom lens according to claim 4,
wherein Conditional Expression (4-1) is satisfied:

$$0.18<fw/f1<0.28 \quad (4\text{-}1).$$

18. The zoom lens according to claim 5,
wherein Conditional Expression (5-1) is satisfied:

$$0.6<fw/(-f2)<0.9 \quad (5\text{-}1).$$

19. The zoom lens according to claim 6,
wherein Conditional Expression (6-1) is satisfied:

$$0.5<L23/fw<0.8 \quad (6\text{-}1).$$

20. An imaging apparatus comprising the zoom lens according to claim 1.

* * * * *